US010542304B2

(12) United States Patent
Tsukagoshi

(10) Patent No.: US 10,542,304 B2
(45) Date of Patent: Jan. 21, 2020

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

(*) Notice: Subject to any disclaimer, the term of this patent is extended or adjusted under 35 U.S.C. 154(b) by 73 days.

(21) Appl. No.: 15/542,524

(22) PCT Filed: Jan. 29, 2016

(86) PCT No.: PCT/JP2016/052594
§ 371 (c)(1),
(2) Date: Jul. 10, 2017

(87) PCT Pub. No.: WO2016/125691
PCT Pub. Date: Aug. 11, 2016

(65) Prior Publication Data
US 2018/0270512 A1  Sep. 20, 2018

(30) Foreign Application Priority Data
Feb. 3, 2015  (JP) .................. 2015-019761

(51) Int. Cl.
*H04N 21/235*  (2011.01)
*G11B 20/10*  (2006.01)
(Continued)

(52) U.S. Cl.
CPC ......... *H04N 21/2353* (2013.01); *G11B 20/10* (2013.01); *H04N 5/278* (2013.01);
(Continued)

(58) Field of Classification Search
CPC .. H04N 21/2353; H04N 5/278; H04N 21/235; H04N 21/4312; H04N 21/4884; H04N 21/8543; G11B 20/10
(Continued)

(56) References Cited

U.S. PATENT DOCUMENTS 5,748,256 A * 5/1998 Tsukagoshi ........ H04N 5/44513
348/569
2005/0078948 A1  4/2005 Yoo et al.
(Continued)

FOREIGN PATENT DOCUMENTS

JP  2004-194311 A  7/2004
JP  2012-169885 A  9/2012
(Continued)

OTHER PUBLICATIONS

International Search Report dated Apr. 19, 2016, in PCT/JP2016/052594, filed Jan. 29, 2016.
(Continued)

*Primary Examiner* — Michael Lee
(74) *Attorney, Agent, or Firm* — Oblon, McClelland, Maier & Neustadt, L.L.P.

(57) ABSTRACT

A video encoder generates a video stream including image data. A subtitle encoder generates a subtitle stream including subtitle information. An adjustment information insertion unit inserts luminance level adjustment information for adjusting the luminance level of a subtitle, into the video stream and/or the subtitle stream. A transmission unit transmits a container in a predetermined format containing the video stream and the subtitle stream. The reception side is enabled to perform subtitle luminance level adjustment.

18 Claims, 29 Drawing Sheets

(51) Int. Cl.
*H04N 5/278* (2006.01)
*H04N 21/431* (2011.01)
*H04N 21/488* (2011.01)
*H04N 21/8543* (2011.01)

(52) U.S. Cl.
CPC ..... *H04N 21/4312* (2013.01); *H04N 21/4884* (2013.01); *H04N 21/8543* (2013.01)

(58) Field of Classification Search
USPC ....................................................... 348/468
See application file for complete search history.

(56) References Cited

U.S. PATENT DOCUMENTS

| 2005/0117813 | A1 | 6/2005 | Nishida et al. |
| 2005/0123283 | A1 | 6/2005 | Li |
| 2009/0303382 | A1* | 12/2009 | Hamada ............... H04N 9/8233 348/468 |
| 2014/0125696 | A1 | 5/2014 | Newton et al. |
| 2016/0241829 | A1* | 8/2016 | Qu .......................... G09G 5/006 |

FOREIGN PATENT DOCUMENTS

| WO | 2005/036550 A1 | 4/2005 |
| WO | 2012/172460 A1 | 12/2012 |
| WO | 2015/007910 A1 | 1/2015 |

OTHER PUBLICATIONS

Nishikawa, "What is 4K Blu-Ray [Ultra HD Blu-Ray] that has come into sight? This is the innovation by 4K/HDR. Is the favorite of a 4K television a 2015 model", The 200$^{th}$ series, Jan. 13, 2015, with English translation, 34 pages.

* cited by examiner

FIG. 7
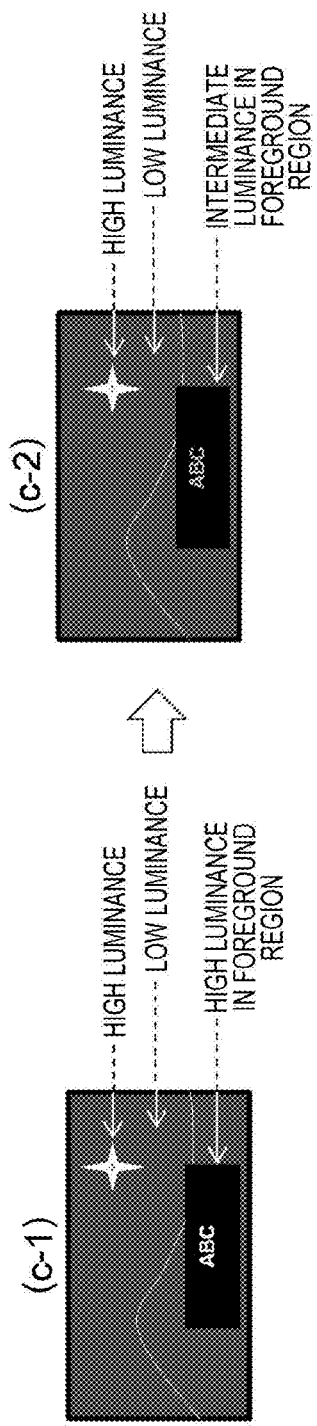
Type c (DARK SCENE WITH HIGH-LUMINANCE PORTION)
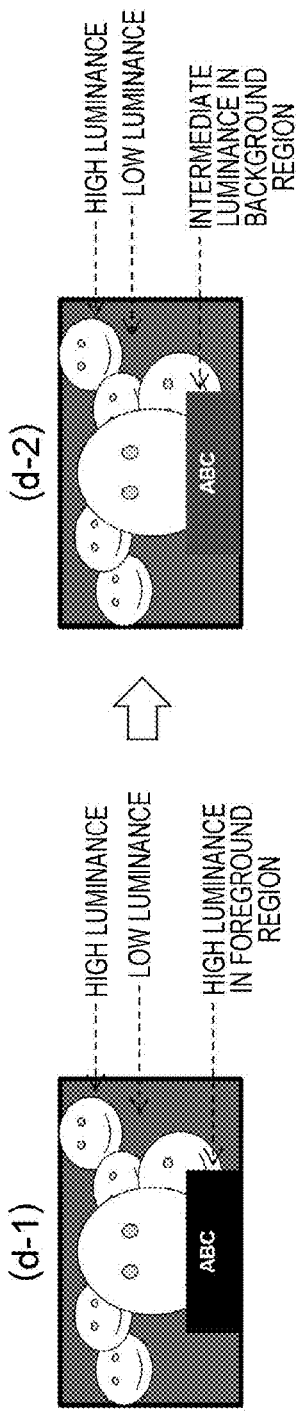
Type d (BRIGHT SCENE WITH LOW LUMINANCE PORTION)

FIG. 8
SUBTITLE LUMINANCE ADJUSTMENT WITH SCREEN-BASED GLOBAL PARAMETERS

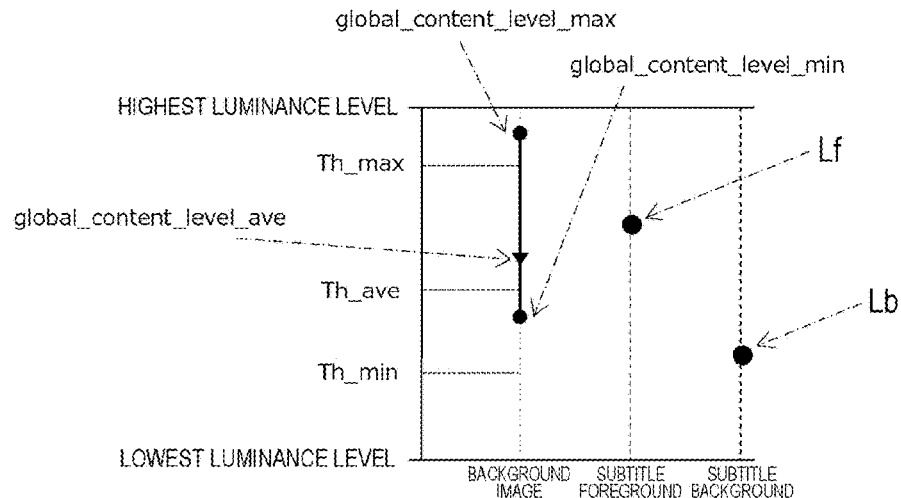

FIG. 9

(a)
```
<tt:style xml:id="textYellow"
          tts:color="#ffff00"              (<- "yellow")
          tts:backgroundColor="#000000"    (<- "black")
/>

<tt:style xml:id="textWhite"
          tts:color="#ffffff"              (<- "white")
          tts:backgroundColor="#000000"    (<- "black")
/>
```

(b)
```
==========================================
EXAMPLE OF SIMPLE COLOR DESIGNATION
Color                       R   G   B black                      "00  00  00"
white                      "FF  FF  FF"
red                        "FF  00  FF"
green                      "00  FF  00"
blue                       "00  00  FF"
yellow                     "FF  FF  00"
magenta                    "FF  00  FF"
cyan                       "00  FF  FF"

EXAMPLE WHERE EACH COMPONENT IS FORMED WITH 8bits
==========================================
```

SUBTITLE LUMINANCE ADJUSTMENT WITH PARTITION-BASED PARAMETERS

EXAMPLE OF SEI SEQUENCE AS HEVC ENCODED STREAM

FIG. 18

Luma_dynamic_range SEI syntax

| Syntax | No. of Bits | Format |
|---|---|---|
| Luma_dynamic_range_SEI( ) { | | |
|   Luma_dynamic_range_id | ue(v) | |
|   Luma_dynamic_range_cancel_flag | u(1) | bmlbf |
|   if( !Luma_dynamic_range_cancel_flag ) { | | |
|     coded_data_bit_depth | 8 | uimsbf |
|     number_of_partitions | 8 | uimsbf |
|     block_size | 8 | uimsbf |
|     global_content_level_max | 16 | uimsbf |
|     global_content_level_min | 16 | uimsbf |
|     global_content_level_ave | 16 | uimsbf |
|     content_threshold_max | 16 | uimsbf |
|     content_threshold_min | 16 | uimsbf |
|     content_threshold_ave | 16 | uimsbf |
|     if (number_of_partitions > 1) { | | |
|       partition_loop() | | |
|     } | | |
|   } | | |
| } | | |

FIG. 19

Luma_dynamic_range SEI syntax (continued)

| Syntax | No. of Bits | Format |
|---|---|---|
| partition_loop ( ) { | | |
|   for ( I = 0; I < number_of_partitions; i++ ){ | | |
|     partition_content_level_max | 16 | uimsbf |
|     partition_content_level_min | 16 | uimsbf |
|     partition_content_level_ave | 16 | uimsbf |
|   } | | |
| } | | |

FIG. 20 semantics

| | |
|---|---|
| Luma_dynamic_range_cancel_flag(1bit) | INDICATING WHETHER TO REFRESH "Luma_dynamic_range" MESSAGE.<br>0 "Luma_dynamic_range" MESSAGE IS TO BE REFRESHED<br>1 MESSAGE IS NOT TO BE REFRESHED. |
| coded_data_bit_depth (8bits) | NUMBER OF ENCODED PIXEL BITS. |
| number_of_partitions (8bits) | INDICATING NUMBER OF PARTITION REGIONS IN SCREEN. |
| block_size (8bits) | EQUIVALENT TO AREA CALCULATED BY DIVIDING BLOCK SIZE OR ENTIRE SCREEN BY NUMBER OF PARTITION REGIONS. |
| global_content_level_max (16bits) | MAXIMUM LUMINANCE VALUE OF ENTIRE SCREEN. |
| global_content_level_min (16bits) | MINIMUM LUMINANCE VALUE OF ENTIRE SCREEN. |
| global_content_level_ave (16bits) | AVERAGE LUMINANCE VALUE OF ENTIRE SCREEN. |
| content_threshold_max (16bits) | HIGH-LUMINANCE THRESHOLD VALUE. |
| content_threshold_min (16bits) | LOW-LUMINANCE THRESHOLD VALUE. |
| content_threshold_ave (16bits) | AVERAGE-LUMINANCE THRESHOLD VALUE. |
| partition_content_level_max (16bits) | MAXIMUM LUMINANCE VALUE IN "partition". |
| partition_content_level_min (16bits) | MINIMUM LUMINANCE VALUE IN "partition". |
| partition_content_level_ave (16bits) | AVERAGE LUMINANCE VALUE IN "partition". |

FIG. 21

TTML STRUCTURE

```
<tt xml:lang="" xmlns="http://www.w3.org/ns/ttml">
  <head>
    <metadata/>
    <styling/>
    <layout/>
  </head>
  <body/>
</tt>
```

FIG. 22

TTML Metadata (TTM)

(a)
```
<metadata xmlns:ttm="http://www.w3.org/ns/ttml#metadata">
    <ttm:title>Timed Text TTML Example</ttm:title>
    <ttm:copyright>The Authors (c) 2006</ttm:copyright>
</metadata>
```

TTML Styling (TTS)

(b)
```
<styling xmlns:tts="http://www.w3.org/ns/ttml#styling">
    <!-- s1 specifies default color, font, and text alignment -->
    <style xml:id="s1"
        tts:color="white"
        tts:fontFamily="proportionalSansSerif"
        tts:fontSize="22px"
        tts:textAlign="center"
    />
    <!-- alternative using yellow text but otherwise the same as style s1 -->
    <style xml:id="s2" style="s1" tts:color="yellow"/>
    <!-- a style based on s1 but justified to the right -->
    <style xml:id="s1Right" style="s1" tts:textAlign="end" />
    <!-- a style based on s2 but justified to the left -->
    <style xml:id="s2Left" style="s2" tts:textAlign="start" />
</styling>
```

TTML Layout (region)

(c)
```
<layout xmlns:tts="http://www.w3.org/ns/ttml#styling">
    <region xml:id="subtitleArea"
        style="s1"
        tts:extent="560px 62px"
        tts:padding="5px 3px"
        tts:backgroundColor="black"
        tts:displayAlign="after"
    />
</layout>
```

FIG. 23

TTML Body

```
<body region="subtitleArea">
    <div>
        <p xml:id="subtitle1" begin="0.76s" end="3.45s">
        It seems a paradox, does it not,
        </p>
        <p xml:id="subtitle2" begin="5.0s" end="10.0s">
        that the image formed on<br/>
        the Retina should be inverted?
        </p>
        <p xml:id="subtitle3" begin="10.0s" end="16.0s" style="s2">
        It is puzzling, why is it<br/>
        we do not see things upside-down?
        </p>
    </div>
</body>
```

FIG. 24

TTML Metadata (TTM)

```
<metadata xmlns:ttm="http://www.w3.org/ns/ttml#metadata">
    <ttm:title>Timed Text TTML Example</ttm:title>
    <ttm:copyright>The Authors (c) 2006</ttm:copyright>
    <ttm-ext:renderingcontrol
            ttm-ext:colorspace="ITUR2020"
            ttm-ext:dynamicrange="ITUR202x"
    />
    <ttm-ext:renderingcontrol
            ttm-ext:lumathmax=TH_max
            ttm-ext:lumathmin=TH_min
            ttm-ext:lumathave=TH_ave
            ttm-ext:renderingdrange=Maxminratio
    />
</metadata>
```

FIG. 25  TTML Styling Extension (TTSE)

```
<styling xmlns:ttsextension="http://www.w3.org/ns/ttml#stylingextension">
    <!-- s1 specifies default color, font, and text alignment -->
    <styleextension xml:id="s1"
           ttse:colorspace="ITUR2020"
           ttse:dynamicrange="ITUR202x"
           ttse:renderingcontrol:lumathmax=TH_max
           ttse:renderingcontrol:lumathmin=TH_min
           ttse:renderingcontrol:lumathave=TH_ave
           ttse:renderingcontrol:renderingdrange=Maxminratio
    />
</styling>
```

FIG. 26

| Syntax | Size | Type |
|---|---|---|
| Subtitle_rendering_control_Segment() { | | |
| sync_byte | 8 | bslbf |
| segment_type | 8 | bslbf |
| page_id | 16 | bslbf |
| segment_length | 16 | uimsbf |
| version_number | 8 | bslbf |
| number_of_regions | 8 | uimsbf |
| for (i=0; i< number_of_regions; i++) { | | |
| region_id ( = xml:id) | 16 | uimsbf |
| colorspace_type | 8 | uimsbf |
| dynamicrange_type | 8 | uimsbf |
| luma_th_max | 16 | uimsbf |
| luma_th_min | 16 | uimsbf |
| luma_th_ave | 16 | uimsbf |
| renderingdrange | 8 | uimsbf |
| } | | |
| } | | |

FIG. 27

HDR_rendering_support_descriptor (a)

| Syntax | No. of Bits | Format |
|---|---|---|
| HDR_rendering_support descriptor(){ | | |
|   descriptor_tag | 8 | uimsbf |
|   descriptor_length | 8 | uimsbf |
|   HDR_flag | 1 | bslbf |
|   composition_control_flag | 1 | bslbf |
|   reserved | 6 | 0x3f |
|   EOTF_type | 8 | uimsbf |
| } | | |

(b)

HDR_flag (1bit)     INDICATING THAT SERVICE STREAM IS COMPATIBLE WITH HDR.
  1    COMPATIBLE WITH HDR
  0    NOT COMPATIBLE WITH HDR composition_control_flag (1bit)    INDICATING THAT "Luma_dynamic_range SEI" IS ENCODED INTO VIDEO STREAM.
  1    "Luma_dynamic_range SEI" IS ENCODED INTO VIDEO STREAM
  0    "Luma_dynamic_range SEI" IS NOT ENCODED INTO VIDEO STREAM

EOTF_type (8bit)    INDICATING VALUE OF VUI OF VIDEO STREAM.

Subtitle_rendering_metadata_descriptor

| Syntax | No. of Bits | Format |
|---|---|---|
| Subtitle_rendering_metadata descriptor(){ | | |
| descriptor_tag | 8 | uimsbf |
| descriptor_length | 8 | uimsbf |
| subtitle_text_flag | 1 | bslbf |
| subtitle_rendering_control_flag | 1 | bslbf |
| meta_container_type | 3 | bslbf |
| reserved | 3 | 0x7 |
| } | | |

(b)

subtitle_text_flag (1bit)  INDICATING THAT SUBTITLE IS TO BE TRANSMITTED IN TEXT CODE.
 1   TEXT-CODED SUBTITLE
 0   NOT TEXT-CODED SUBTITLE subtitle_rendering_control_flag (1bit) INDICATING THAT LUMINANCE ADJUSTMENT META-INFORMATION ABOUT SUBTITLE IS ENCODED.
 1   LUMINANCE ADJUSTMENT META-INFORMATION IS ENCODED.
 0   LUMINANCE ADJUSTMENT META-INFORMATION IS NOT ENCODED.

meta_container_type (3bits) INDICATING STORAGE SITE OF LUMINANCE ADJUSTMENT META-INFORMATION.
 0   STORED IN "Segment"
 1   STORED IN "text metadata"
 2   STORED IN "text styling extension"
 others   reserved

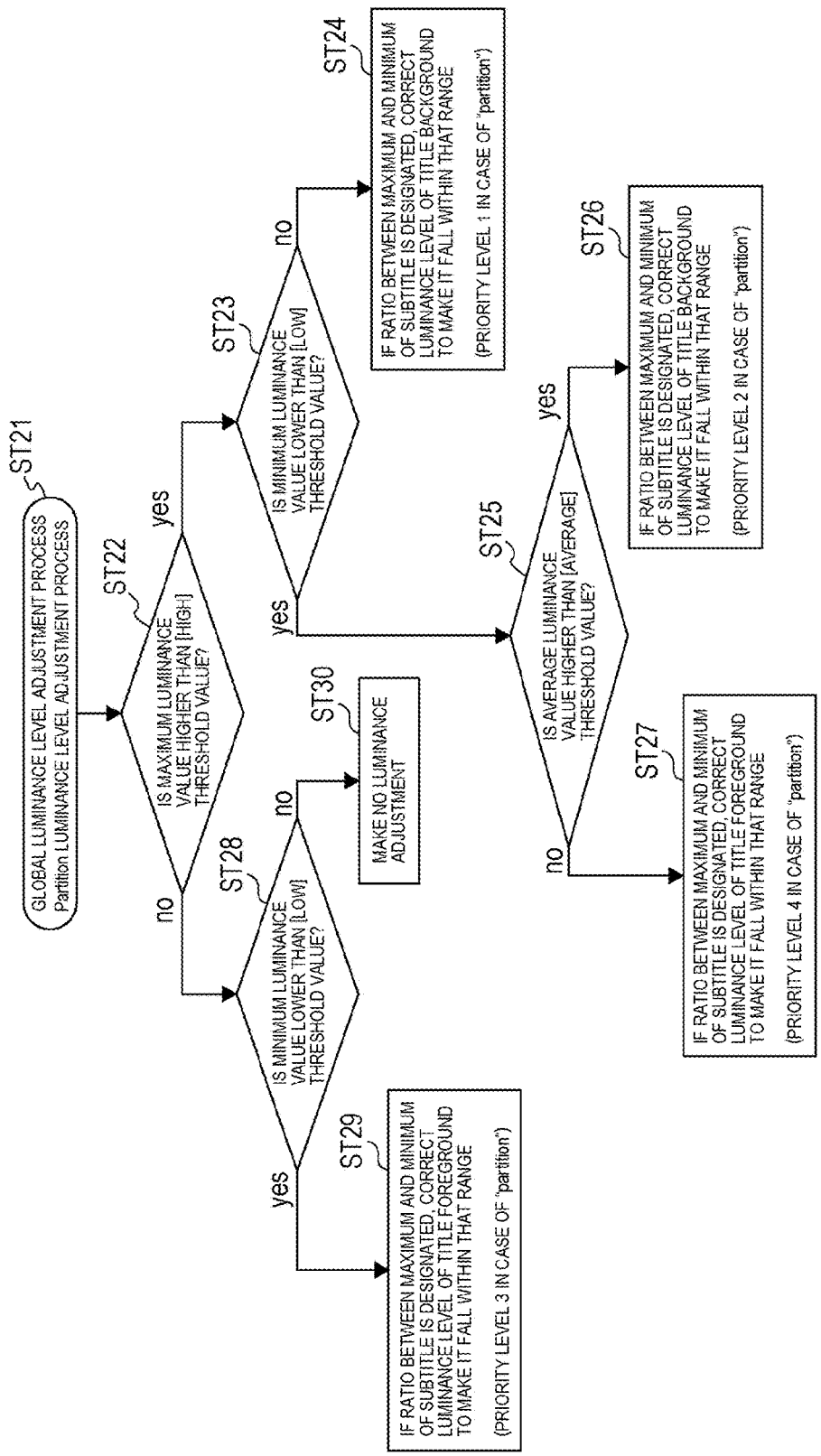

TRANSMISSION DEVICE, TRANSMISSION METHOD, RECEPTION DEVICE, AND RECEPTION METHOD

TECHNICAL FIELD

The present technology relates to transmission devices, transmission methods, reception devices, and reception methods, and more particularly to a transmission device and the like that transmit subtitle information as well as image data.

BACKGROUND ART

In conventional digital video broadcasting (DVB) and the like, subtitle information is transmitted in the form of bitmap data. Recently, transmission of subtitle information in the form of a text character code, or transmission of text-based subtitle information, has been suggested (see Patent Document 1).

CITATION LIST

Patent Document

Patent Document 1: Japanese Patent Application Laid-Open No. 2012-169885

SUMMARY OF THE INVENTION

Problems to be Solved by the Invention

In a case where the image (background image) on which a subtitle is to be superimposed is a high dynamic range (HDR) image having a very high contrast ratio, for example, the luminance level of the subtitle needs to be adjusted appropriately in accordance with the contents of the image, so as to reduce visual fatigue or the like.

The present technology aims to enable the reception side to perform subtitle luminance level adjustment in a preferred manner.

Solutions to Problems

A concept of the present technology lies in a transmission device that includes:

a video encoder that generates a video stream including image data;

a subtitle encoder that generates a subtitle stream including subtitle information;

an adjustment information insertion unit that inserts luminance level adjustment information into the video stream and/or the subtitle stream, the luminance level adjustment information being designed for adjusting a luminance level of a subtitle; and a transmission unit that transmits a container in a predetermined format, the container containing the video stream and the subtitle stream.

In the present technology, a video stream, including image data is generated by the video encoder. For example, a video stream including transmission video data obtained through high dynamic range photoelectric conversion performed on high dynamic range image data is generated. A subtitle stream including subtitle information is generated by the subtitle encoder. For example, a subtitle stream that has segments as components including subtitle text information is generated.

Luminance level adjustment information for adjusting the luminance level of a subtitle is inserted into the video stream and/or the subtitle stream by the adjustment information insertion unit. For example, the luminance level adjustment information may be luminance level adjustment information corresponding to an entire screen and/or luminance level adjustment information corresponding to respective partition regions obtained by dividing the screen by a predetermined number.

For example, the luminance level adjustment information to be inserted into the video stream may include a maximum luminance value, a minimum luminance value, and an average luminance value that are generated in accordance with the image data. In this case, the luminance level adjustment information to be inserted into the video stream may further include a high-luminance threshold value, a low-luminance threshold value, and an average-luminance threshold value that are set in accordance with electro-optical transfer function characteristics, for example.

For example, the luminance level adjustment information to be inserted into the subtitle stream may include subtitle luminance range limit information. In this case, the luminance level adjustment information to be inserted into the subtitle stream may further include a high-luminance threshold value, a low-luminance threshold value, and an average-luminance threshold value that are set in accordance with electro-optical transfer function characteristics, for example. Also, in this case, the luminance level adjustment information to be inserted into the subtitle stream may further include color space information, for example.

For example, the subtitle encoder may generate the subtitle stream in accordance with subtitle text information in a TTML structure or a structure similar to a TTML structure, and the adjustment information insertion unit may insert the luminance level adjustment information, using the elements of the metadata or the elements of the styling extension in the header of the corresponding structure. Also, the subtitle encoder may generate the subtitle stream having segments as components, and the adjustment information insertion unit may insert a segment containing the luminance level adjustment information into the subtitle stream, for example.

A container in a predetermined format containing the video stream and the subtitle stream is transmitted by the transmission unit. For example, the container may be a transport stream (MPEG-2 TS) that is employed in digital broadcasting standards. Also, the container may be a container in MP4, which is used in Internet deliveries, or a container in some other format, for example.

In the present technology, the luminance level adjustment information for adjusting the luminance level of a subtitle is inserted into the video stream and/or the subtitle stream. Thus, the reception side can perform subtitle luminance level adjustment in a preferred manner.

It should be noted that, in the present technology, for example, the transmission device may further include an identification information insertion unit that inserts identification information into the container, the identification information indicating that there is the luminance level adjustment information inserted in the video stream. In this case, the reception side can easily recognize, from the identification information, that there is the luminance level adjustment information inserted in the video stream.

Also, in the present technology, for example, the transmission device may further include an identification information insertion unit that inserts identification information into the container, the identification information indicating that there is the luminance level adjustment information inserted in the subtitle stream. In this case, information indicating the insertion position of the luminance level adjustment information in the subtitle stream may be added to the identification information, for example. In this case, the reception side can easily recognize, from the identification information, that there is the luminance level adjustment information inserted in the subtitle stream.

In addition, another concept of the present technology lies in a reception device that includes:

a reception unit that receives a container in a predetermined format, the container containing a video stream including image data and a subtitle stream including subtitle information;

a video decoding unit that obtains image data by performing a decoding process on the video stream;

a subtitle decoding unit that obtains bitmap data of a subtitle by performing a decoding process on the subtitle stream;

a luminance level adjustment unit that performs a luminance level adjustment process on the bitmap data in accordance with luminance level adjustment information; and a video superimposition unit that superimposes bitmap data obtained by the luminance level adjustment unit after the luminance level adjustment, on the image data obtained by the video decoding unit.

In the present technology, a container in a predetermined format containing a video stream including image data and a subtitle stream including subtitle information is received by the reception unit. The video stream includes transmission video data obtained through high dynamic range photoelectric conversion performed on high dynamic range image data, for example. The subtitle stream includes, for example, bitmap data as subtitle information, or text information about a subtitle.

A decoding process is performed on the video stream, and image data is obtained by the video decoding unit. A decoding process is performed on the subtitle stream, and bitmap data of the subtitle is obtained by the subtitle decoding unit. A luminance level adjustment process is performed on the bitmap data by the luminance level adjustment unit in accordance with luminance level adjustment information. The bitmap data after the luminance level adjustment is then superimposed on the image data by the video superimposition unit.

For example, the luminance level adjustment unit may perform the luminance level adjustment, using the luminance level adjustment information inserted in the video stream and/or the subtitle stream. Also, the reception device may further include a luminance level adjustment information generation unit that generates the luminance level adjustment information, for example, and the luminance level adjustment unit may perform the luminance level adjustment, using the luminance level adjustment information generated by the luminance level adjustment information generation unit.

As described above, in the present technology, a luminance level adjustment process is performed on bitmap data of the subtitle to be superimposed on image data, in accordance with luminance level adjustment information. Accordingly, the luminance of the subtitle becomes suitable for the background image. Thus, visual fatigue due to a large luminance difference between the background image and the subtitle can be reduced, and the atmosphere of the background image can be prevented from being spoiled.

Yet another concept of the present technology lies in a transmission device that includes:

a transmission unit that transmits a video stream in a container in a predetermined format, the video stream including transmission video data obtained through high dynamic range photoelectric conversion performed on high dynamic range image data; and an identification information insertion unit that inserts identification information into the container, the identification information indicating that the video stream is compatible with a high dynamic range.

In the present technology, a video stream including transmission video data obtained through high dynamic range photoelectric conversion performed on high dynamic range image data is transmitted in a container in a predetermined format by the transmission unit. Identification information indicating that the video stream is compatible with the high dynamic range is inserted into the container by the identification information insertion unit.

As described above, in the present technology, the identification information indicating that the video stream is compatible with the high dynamic range is inserted into the container. Thus, the reception side can easily recognize, from the identification information, that the video stream is compatible with the high dynamic range.

Still another concept of the present technology lies in a transmission device that includes:

a transmission unit that transmits a video stream and a subtitle stream in a container in a predetermined format, the video stream including image data, the subtitle stream including text information about a subtitle; and an identification information insertion unit that inserts identification information into the container, the identification information indicating that the subtitle is transmitted in the form of a text code.

In the present technology, a video stream including image data and a subtitle stream including text information about a subtitle are transmitted in a container in a predetermined format by the transmission unit. Identification information indicating that the subtitle is transmitted in the form of a text code is inserted into the container by the identification information insertion unit.

As described above, in the present technology, the identification information indicating that a subtitle is transmitted in the form of a text code is inserted into the container. Thus, the reception side can easily recognize, from the identification information, that the subtitle is transmitted in the form of a text code.

Effects of the Invention

According to the present technology, the reception side can perform subtitle luminance level adjustment in a preferred manner. It should be noted that the advantageous effects described in this specification are merely examples, and the advantageous effects of the present technology are not limited to them and may include additional effects.

BRIEF DESCRIPTION OF DRAWINGS

FIGS. 7(c-1) through 7(d-2) are diagrams for explaining subtitle luminance level adjustment (in a dark scene with a high-luminance portion, and a bright scene with a low-luminance portion) on the reception side.

FIG. 8 is a diagram for explaining subtitle luminance level adjustment with global parameters for a screen.

FIGS. 9(a) and 9(b) are diagrams for explaining color designation by a method of transmitting subtitle information in the form of text.

FIG. 18 is a table showing an example structure of a luma dynamic range SEI message (1/2).

FIG. 19 is a table showing the example structure of the luma dynamic range SEI message (2/2).

FIG. 20 is a chart showing the contents of principal information in an example structure of a luma dynamic range SEI message.

FIG. 21 is a chart showing a TTML structure.

FIGS. 22(a) through 22(c) are charts showing example structures of the respective elements of metadata "metadata", styling "styling", and layout "layout" in the header "head" of the TTML structure.

FIG. 23 is a chart showing an example structure of the body "body" of the TTML structure.

FIG. 24 is a chart showing an example structure of the metadata (TTM: TTML Metadata) in a case where the luminance level adjustment information is inserted with the use of the elements of the metadata "metadata" in the header of the TTML structure.

FIG. 25 is a chart showing an example structure of styling extension (TTM: Styling Extension) in a case where the luminance level adjustment information is inserted with the use of the elements of the styling extension "styling extension" in the header of the TTML structure.

FIG. 26 is a table showing an example structure of a subtitle rendering control segment containing the luminance level adjustment information.

FIG. 27(a) is a table showing an example structure of an HDR rendering support descriptor, and FIG. 27(b) is a chart showing the contents of the principal information in the example structure.

FIG. 28(a) is a table showing an example structure of a subtitle rendering metadata descriptor, and FIG. 28(b) is a chart showing the contents of the principal information in the example structure.

FIG. 33 is a flowchart showing an example of a global luminance level adjustment process in the reception device.

MODE FOR CARRYING OUT THE INVENTION

The following is a description of a mode for embodying the present technology (the mode will be hereinafter referred to as the "embodiment"). Explanation will be made in the following order.

1. Embodiment
2. Modifications

1. Embodiment

[Example Configuration of a Transmission/Reception System]

Figure 1:
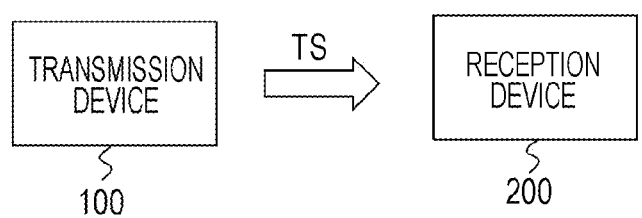
FIG. 1 is a block diagram showing an example configuration of a transmission/reception system as an embodiment.

FIG. 1 shows an example of a transmission/reception system 10 as an embodiment. This transmission/reception system 10 includes a transmission device 100 and a reception device 200.

The transmission device 100 generates an MPEG2 transport stream TS as a container, and transmits this transport stream TS in the form of broadcast waves or a network packet. This transport stream TS contains a video stream including image data. This transport stream TS also contains a subtitle stream including subtitle information. Luminance level adjustment information for adjusting the luminance level of a subtitle is inserted into the video stream and/or the subtitle stream.

The reception device 200 receives the transport stream TS transmitted from the transmission device 100. The reception device 200 obtains the image data by performing a decoding process on the video stream, and obtains bitmap data of the subtitle by performing a decoding process on the subtitle stream. Furthermore, in accordance with the luminance level adjustment information inserted into the video stream and/or the subtitle stream, the reception device 200 performs a luminance level adjustment process on bitmap data of the subtitle, and superimposes the adjusted bitmap data on the image data. It should be noted that, if the video stream and/or the subtitle stream does not have the luminance level adjustment information inserted therein, the reception device 200 generates luminance level adjustment information and uses the luminance level adjustment information.

Figure 2:
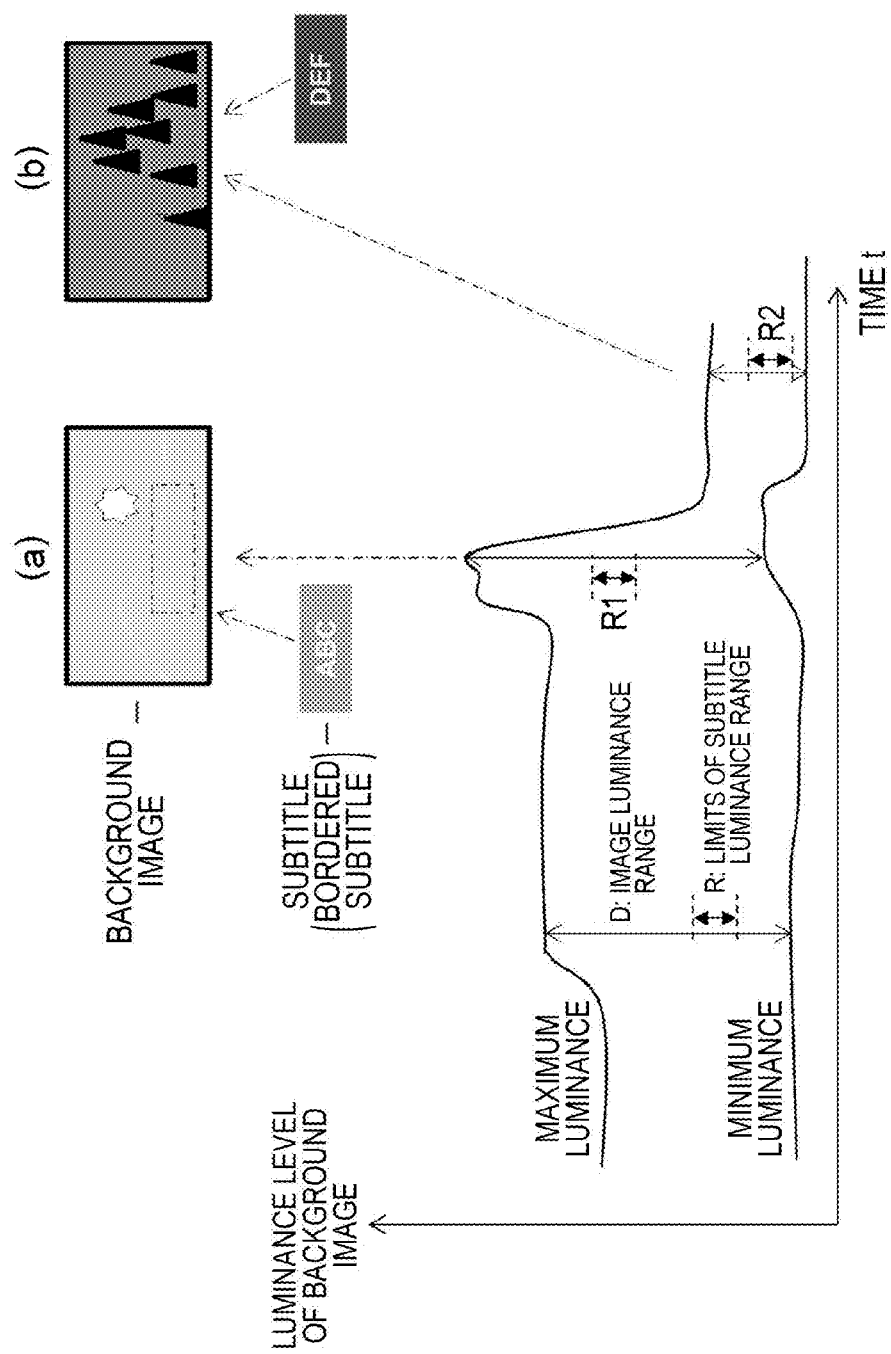
FIGS. 2(a) and 2(b) are diagrams for explaining the outline of subtitle luminance level adjustment.

FIGS. 2(a) and 2(b) show the outline of subtitle luminance level adjustment. In FIGS. 2(a) and 2(b), the abscissa axis indicates time, and the ordinate axis indicates the luminance level of a background image (an image based on image data). The maximum luminance and the minimum luminance in the background image change with time. In the case of an HDR image, the luminance range D from the minimum luminance to the maximum luminance is very wide.

In the subtitle luminance level adjustment, the luminance level of the entire subtitle is adjusted in accordance with the luminance (the maximum luminance, the minimum luminance, and the average luminance) of the background image, and the subtitle luminance range is limited to a range R. Bordered subtitles are normally used as subtitles. A bordered subtitle has a rectangular border portion surrounding the text portion. The subtitle luminance range in this case means the luminance range of the entire region including both the text portion and the border portion.

It should be noted that a rimmed subtitle may also be used as a subtitle, and is subjected to luminance level adjustment like a bordered subtitle. In this case, the rim portion is equivalent to the border portion. In this embodiment, a bordered subtitle is taken as an example and will be described below.

In a case where the entire image is bright as shown in FIG. 2(a), the luminance level of the entire subtitle (having a text portion "ABC") is adjusted to a high level. At this point, the subtitle luminance range is limited to a range R1 that is associated with this subtitle in advance. In a case where the entire image is dark as shown in FIG. 2(b), on the other hand, the luminance level of the entire subtitle (having a text portion "DEF") is adjusted to a low level. At this point, the subtitle luminance range is limited to a range R2 that is associated with this subtitle in advance.

[Luminance Level Adjustment Information]

Figure 3:
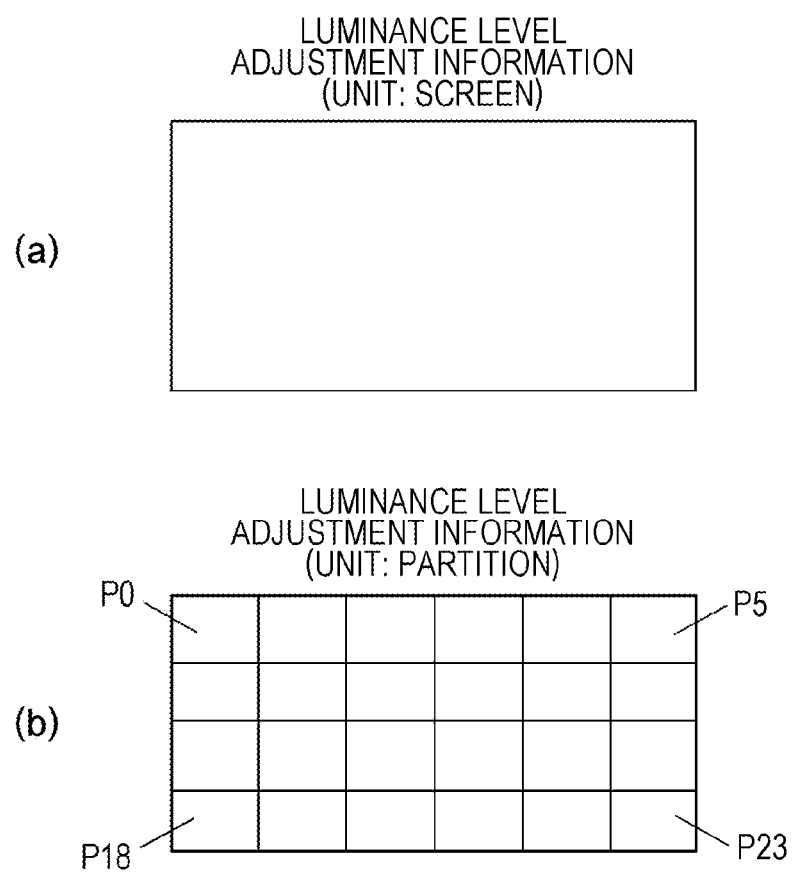
FIGS. 3(a) and 3(b) are diagrams for explaining luminance level adjustment information to be transmitted from the transmission side (luminance level adjustment information corresponding to an entire screen, and luminance level adjustment information corresponding to respective partition regions obtained by dividing the screen by a predetermined number).

The luminance level adjustment information to be transmitted from the transmission side is now described. The luminance level adjustment information includes luminance level adjustment information corresponding to an entire screen as shown in FIG. 3(a), and luminance level adjustment information corresponding to respective partition regions (hereinafter referred to "partitions" as appropriate) obtained by dividing a screen by a predetermined number as shown in FIG. 3(b). It should be noted that FIG. 3(b) shows an example case where a screen is divided by 24, to form 24 partitions P0 through P23.

The maximum luminance value "global_content_level_max", the minimum luminance value "global_content_level_min", and the average luminance value "global_content_level_ave" that correspond to the entire screen are inserted into the video stream, and the maximum luminance values "partition_content_level_max", the minimum luminance values "partition_content_level_min", and the average luminance values "partition_content_level_ave" that correspond to the respective partitions are also inserted into the video stream. These values are obtained in accordance with the image data. It should be noted that the values corresponding to both the entire screen and the respective partitions are not necessarily inserted, and the values corresponding to either the entire screen or the respective partitions may be inserted.

Further, a high-luminance threshold value "Th_max", a low-luminance threshold value "Th_min", and an average-luminance threshold value "Th_ave" for determining how the subtitle luminance is to be adjusted on the reception side are inserted into the video stream. These values are obtained in accordance with electro-optical transfer function characteristics (EOTF characteristics).

Figure 4:
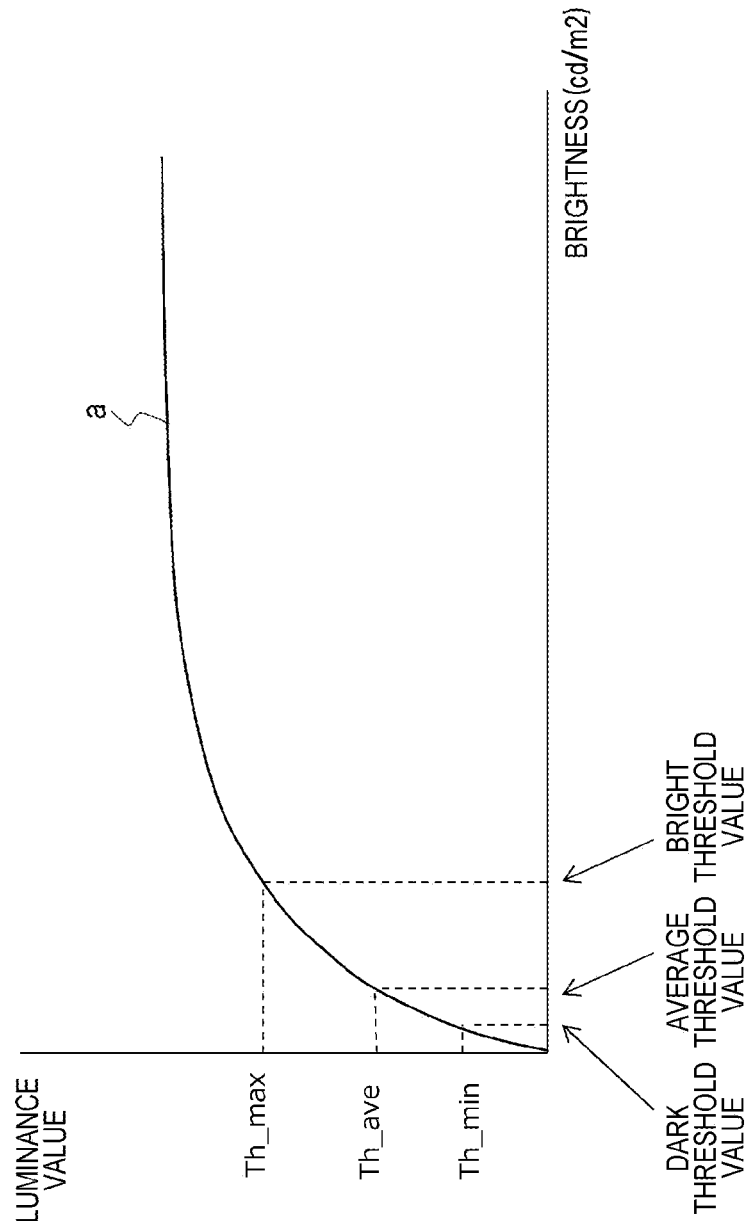
FIG. 4 is a graph for explaining setting of threshold values (a high-luminance threshold value, a low-luminance threshold value, and an average-luminance threshold value) for combining.

A curve a in FIG. 4 represents the EOTF characteristics. Threshold values recommended in broadcast/distribution services, or the respective luminance values corresponding to the dark threshold value, the average threshold value, and the bright threshold value, are set at "Th_min", "Th_ave", and "Th_max". It should be noted that these values may not be inserted into the video stream, as long as they are inserted into the subtitle stream.

The high-luminance threshold value "Th_max", the low-luminance threshold value "Th_min", and the average-luminance threshold value "Th_ave", which have been described above, are inserted into the subtitle stream. It should be noted that these values may not be inserted into the subtitle stream, as long as they are inserted into the video stream. Subtitle luminance range limit information "renderingdrange" is also inserted into the subtitle stream. Color space information "colorspace" is further inserted into the subtitle stream.

Figure 5:
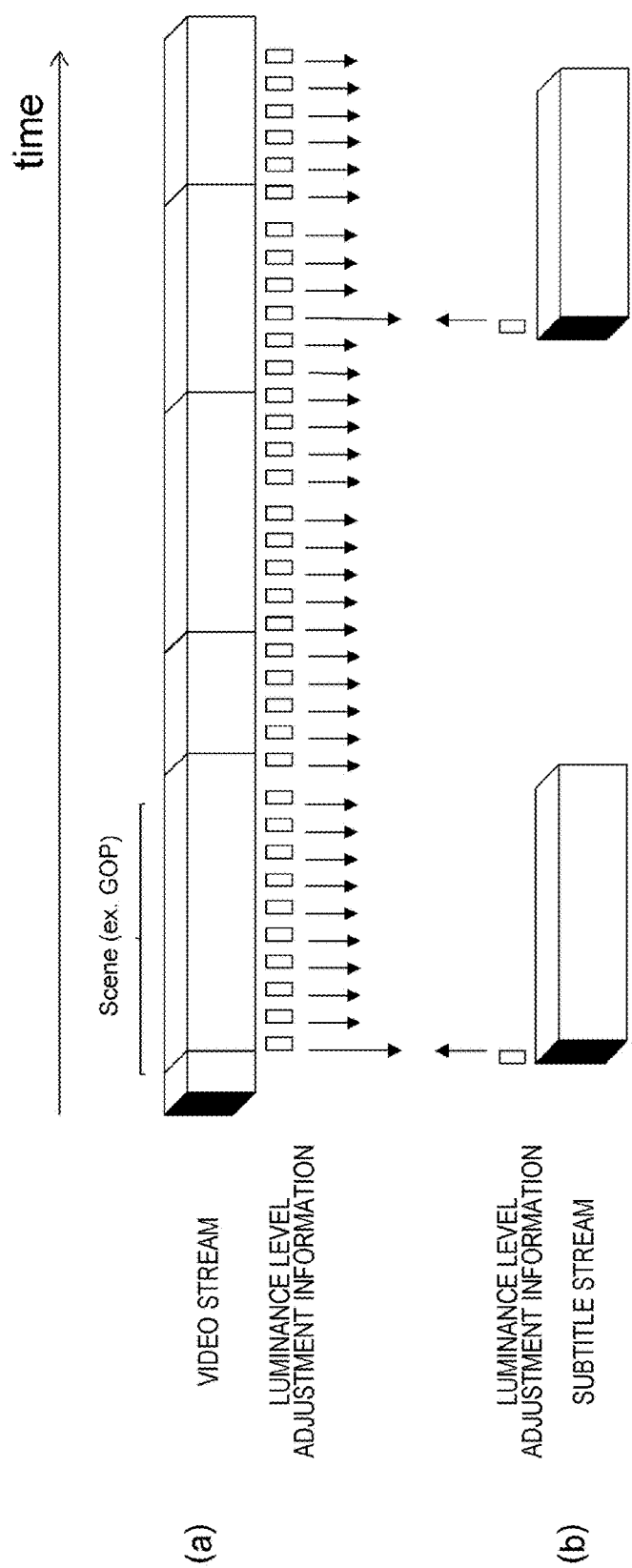
FIGS. 5(a) and 5(b) are diagrams for explaining the insertion time positions of the luminance level adjustment information into a video stream and a subtitle stream.

The luminance level adjustment information described above is inserted as an SEI message, for example, into the video stream. Therefore, the luminance level adjustment information is inserted into the video stream on a picture-by-picture basis, for example, as shown in FIG. 5(a).

It should be noted that the luminance level adjustment information may be inserted on a GOP-by-GOP basis or on some other basis. The luminance level adjustment information described above is also inserted into the subtitle stream on a subtitle display basis, for example.

[Subtitle Luminance Level Adjustment]

The subtitle luminance level adjustment on the reception side is now described. In a case where a subtitle is superimposed on an HDR image as the background image, the luminance contrast between the background image and the subtitle is great on the display, and objects with a large luminance difference coexist in the screen, leading to visual fatigue. To prevent that, the subtitle luminance level is adjusted while the HDR effect of the background image is maintained. In that case, the foreground region in the text portion of the subtitle and the background region in the border portion are controlled separately from each other, in accordance with the luminance in the background image.

Figure 6:
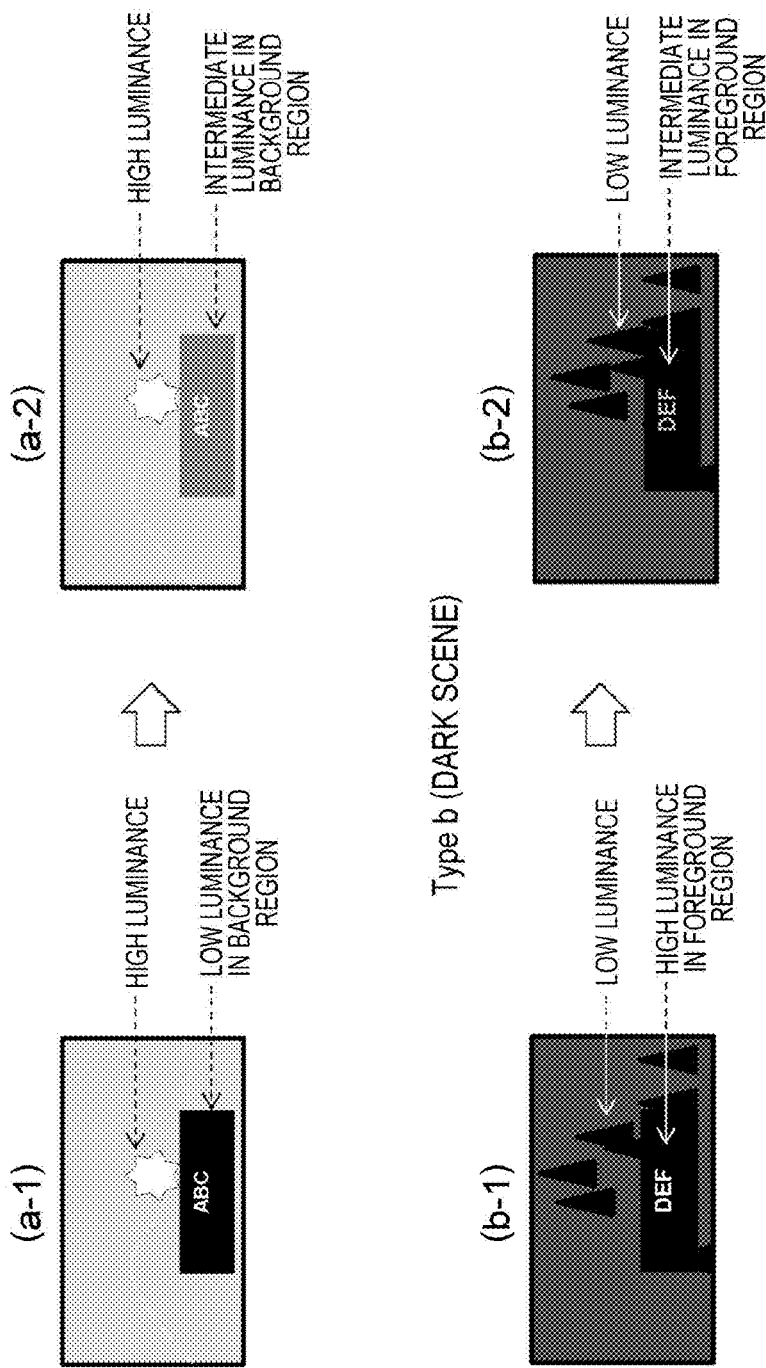
FIGS. 6(a-1) through 6(b-2) are diagrams for explaining subtitle luminance level adjustment (in bright scene and a dark scene) on the reception side.

Referring now to FIGS. 6(a-1) and 6(a-2), the subtitle luminance level adjustment in the case of a "bright scene" as type a is described. In this case, there is a high-luminance region in the background image. If the subtitle is superimposed directly on such a background image as shown in FIG. 6(a-1), the resultant image is difficult to view and causes visual fatigue, since the luminance difference between the low-luminance background region and the adjacent high-luminance region in the background image is large. Also, the low-luminance background region stands out, and spoils the bright atmosphere. Therefore, in this case, luminance level adjustment is performed to increase the luminance level of the background region from the low luminance to an intermediate luminance, and the subtitle is then superimposed on the background image, as shown in FIG. 6(a-2).

Referring now to FIGS. 6(b-1) and 6(b-2), the subtitle luminance level adjustment in the case of a "dark scene" as type b is described. In this case, there is a low-luminance region in the background image. If the subtitle is superimposed directly on such a background image, the high-luminance foreground region stands out, and spoils the dark atmosphere, as shown in FIG. 6(b-1). Therefore, in this case, luminance level adjustment is performed to lower the luminance level of the foreground region from the high luminance to an intermediate luminance, and the subtitle is then superimposed on the background image, as shown in FIG. 6(b-2).

Referring now to FIGS. 7(c-1) and 7(c-2), the subtitle luminance level adjustment in the case of a "dark scene with a high-luminance portion" as type c is described. In this case, there is a high-luminance region in the background image that gives a dark total impression, and the background image has a high contrast ratio. If the subtitle is superimposed directly on such a background image, the high-luminance foreground region stands out, and spoils the dark atmosphere, as shown in FIG. 7(c-1). Therefore, in this case, luminance level adjustment is performed to lower the luminance level of the foreground region from the high luminance to an intermediate luminance, and the subtitle is then superimposed on the background image, as shown in FIG. 7(c-2).

Referring now to FIGS. 7(d-1) and 7(d-2), the subtitle luminance level adjustment in the case of a "bright scene with a low-luminance portion" as type d is described. In this case, there is a low-luminance region in the background image that gives a bright total impression, and the background image has a high contrast ratio. If the subtitle is superimposed directly on such a background image as shown in FIG. 7(d-1), the resultant image is difficult to view and causes visual fatigue, since the luminance difference between the low-luminance background region and the adjacent high-luminance region in the background image is large. Also, the low-luminance background region stands out, and spoils the bright atmosphere. Therefore, in this case, luminance level adjustment is performed to increase the luminance level of the background region from the low luminance to an intermediate luminance, and the subtitle is then superimposed on the background image, as shown in FIG. 7(d-2).

Subtitle luminance level adjustment is performed with global parameters for the screen in some cases, and is performed with parameters for the respective partitions in some other cases. First, subtitle luminance level adjustment with global parameters for the screen is described. As shown in the chart in FIG. 8, the maximum luminance value "global_content_level_max", the minimum luminance value "global_content_level_min", and the average luminance value "global_content_level_ave" that correspond to the entire screen are used in this case. Also, in this case, a high-luminance threshold value "Th_max", a low-luminance threshold value "Th_min", and an average-luminance threshold value "Th_ave" are used for controlling the adjustment. Further, the luminance "Lf" in the foreground region of the subtitle and the luminance "Lb" in the background region of the subtitle are used in this case.

Here, how the luminances Lf and Lb are determined is described. By a conventional method of transmitting subtitle information in the form of text, color designation is performed with six-digit color codes or color names such as "Red", "Green", "Blue", and "White". FIG. 9(a) shows an example of Timed Text Markup Language (TTML). The six-digit color codes are based on the table shown in FIG. 9(b).

In the example of TTML, "color" indicates the color of the foreground region that is the text portion of a subtitle, and "backgroundColor" indicates the color of the background region that is the border portion of the subtitle. The example shown in FIG. 9(a) indicates that the color of the foreground region of a subtitle is "#ffff00", which is "Yellow", and the color of the background region is "#000000", which is "Black". The example shown in FIG. 9(a) also indicates that the color of the foreground region of another subtitle is "#ffffff", which is White", and the color of the background region is "#000000", which is "Black".

As described above, the subtitle color information transmission is conducted for the foreground region and the background region separately from each other, but is often performed in an RGB domain for either of the regions. In an RGB domain, the relationship between visibility and luminance is not a linear relationship. Therefore, subtitle luminance level adjustment is performed through a transfer from the RGB domain to a YCbCr domain (a luminance/chrominance domain) in the conversion described below.

Color conversion depends on color spaces, and the expressions for converting the chromaticity values of R, G, and B into a luminance Y in the respective color spaces "Bt.709" and "Bt.2020", for example, are shown below.

$$Y=0.212R+0.715G+0.072B \text{ (in the case of } Bt.709\text{)}$$

$$Y=0.262R+0.678G+0.059B \text{ (in the case of } Bt.2020\text{)}$$

On the reception side, color conversion is performed on the color information (R, G, B) about the foreground region and the background region of the subtitle, so that the luminances Lf and Lb are determined. As described above, color conversion depends on color spaces. Therefore, in this embodiment, the color space information "colorspace" about the color information (R, G, B) is inserted into the subtitle stream.

It should be noted that subtitle information may be transmitted in the form of bitmap data, instead of text. In this case, the luminances Lf and Lb can be obtained from GLUT outputs on the reception side.

The subtitle luminance level adjustment in the "bright scene" of type a shown in FIGS. 6(a-1) and 6(a-2) is now described. The chart in FIG. 10(a-1) corresponds to FIG. 6(a-1). In the description below, the maximum luminance value is represented by "max", the minimum luminance value is represented by "min", and the average luminance value is represented by "ave". Since Th_max<max, it is determined that a region with a very high luminance exists in the background image. Also, since Th_ave<ave, the background image is determined to be bright overall. Further, since Th_min<min, it is determined that any region with a very low luminance does not exist in the background image. The luminance Lf in the foreground region of the subtitle and the luminance Lb in the background region of the subtitle are at the levels shown in the drawing.

Figure 10:
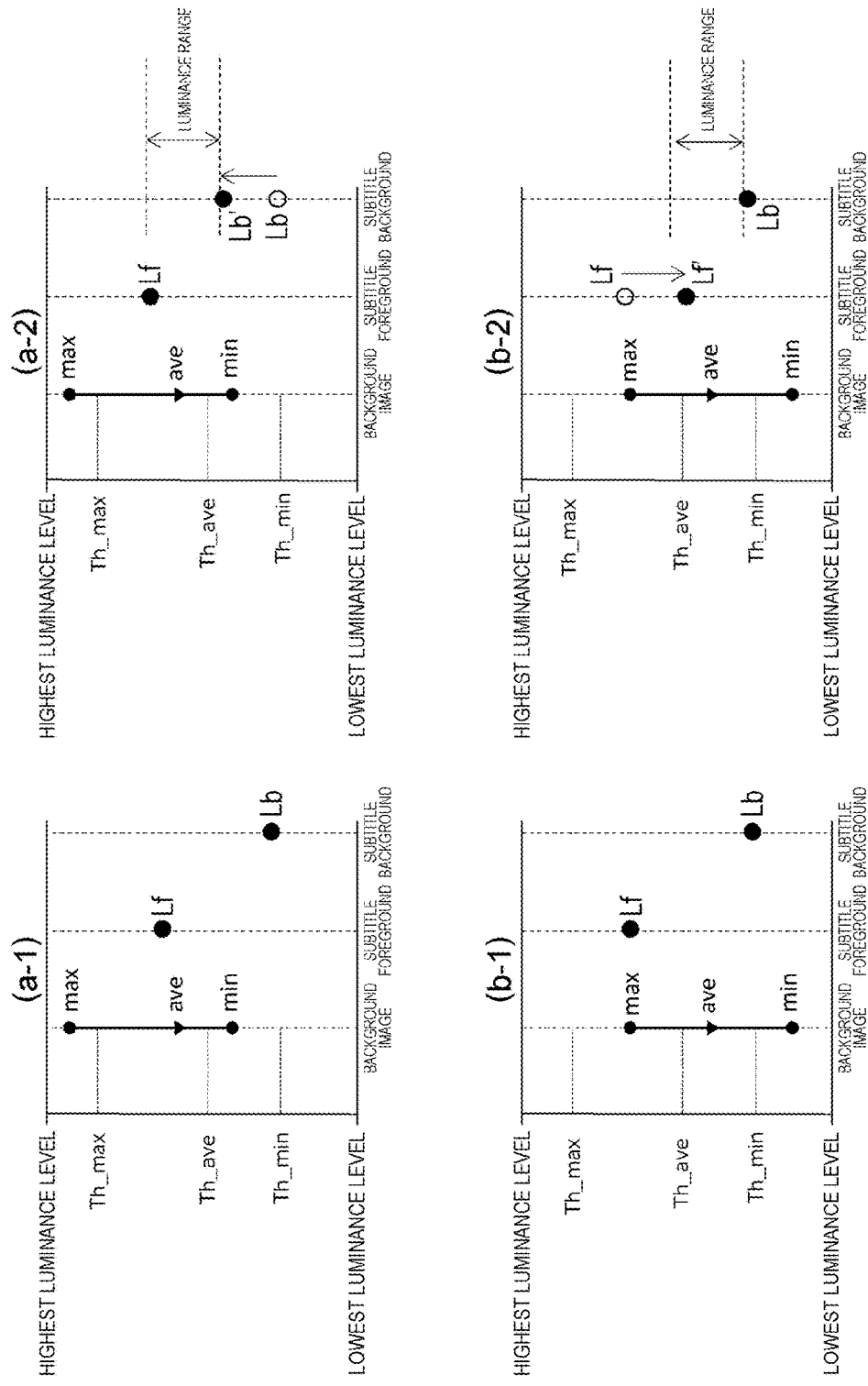
FIGS. 10(a-1) through 10(b-2) are diagrams for explaining subtitle luminance level adjustment in a bright scene and a dark scene.

In this case, as shown in FIG. 10(a-2), the luminance Lb in the background region of the subtitle is adjusted and increased to a luminance Lb', and the luminance range is adjusted to satisfy the subtitle luminance range limit information "renderingdrange". The "renderingdrange" indicates the ratio between the luminance in the foreground and the luminance in the background region, and the level of the luminance Lb' is adjusted so that Lf/Lb' becomes equal to or lower than the ratio.

Next, the subtitle luminance level adjustment in the "dark scene" of type b shown in FIGS. 6(b-1) and 6(b-2) is described. The chart in FIG. 10(b-1) corresponds to FIG. 6(b-1). Since Th_max>max, it is determined that any region with a very high luminance does not exist in the background image. Also, since Th_ave>ave, the background image is determined to be dark overall. Further, since Tb_min>min, it is determined that a region with a very low luminance exists in the background image. The luminance Lf in the foreground region of the subtitle and the luminance Lb in the background region of the subtitle are at the levels shown in the drawing.

In this case, as shown in FIG. 10(*b*-2), the luminance Lf in the foreground region of the subtitle is adjusted and lowered to a luminance Lf', and the luminance range is adjusted to satisfy the subtitle luminance range limit information "renderingdrange". That is, the level of the luminance Lf' is adjusted so that Lf'/Lb becomes equal to or lower than the ratio indicated by "renderingdrange".

Next, the subtitle luminance level adjustment in the "dark scene with a high-luminance portion" of type c shown in FIGS. 7(*c*-1) and 7(*c*-2) is described. The chart in FIG. 11(*c*-1) corresponds to FIG. 7(*c*-1). Since Th_max<max, it is determined that a region with a very high luminance exists in the background image. Also, since Th_ave>ave, the background image is determined to be dark overall. Further, since Th_min>min, it is determined that a region with a very low luminance exists in the background image. The luminance Lf in the foreground region of the subtitle and the luminance Lb in the background region of the subtitle are at the levels shown in the drawing.

Figure 11:
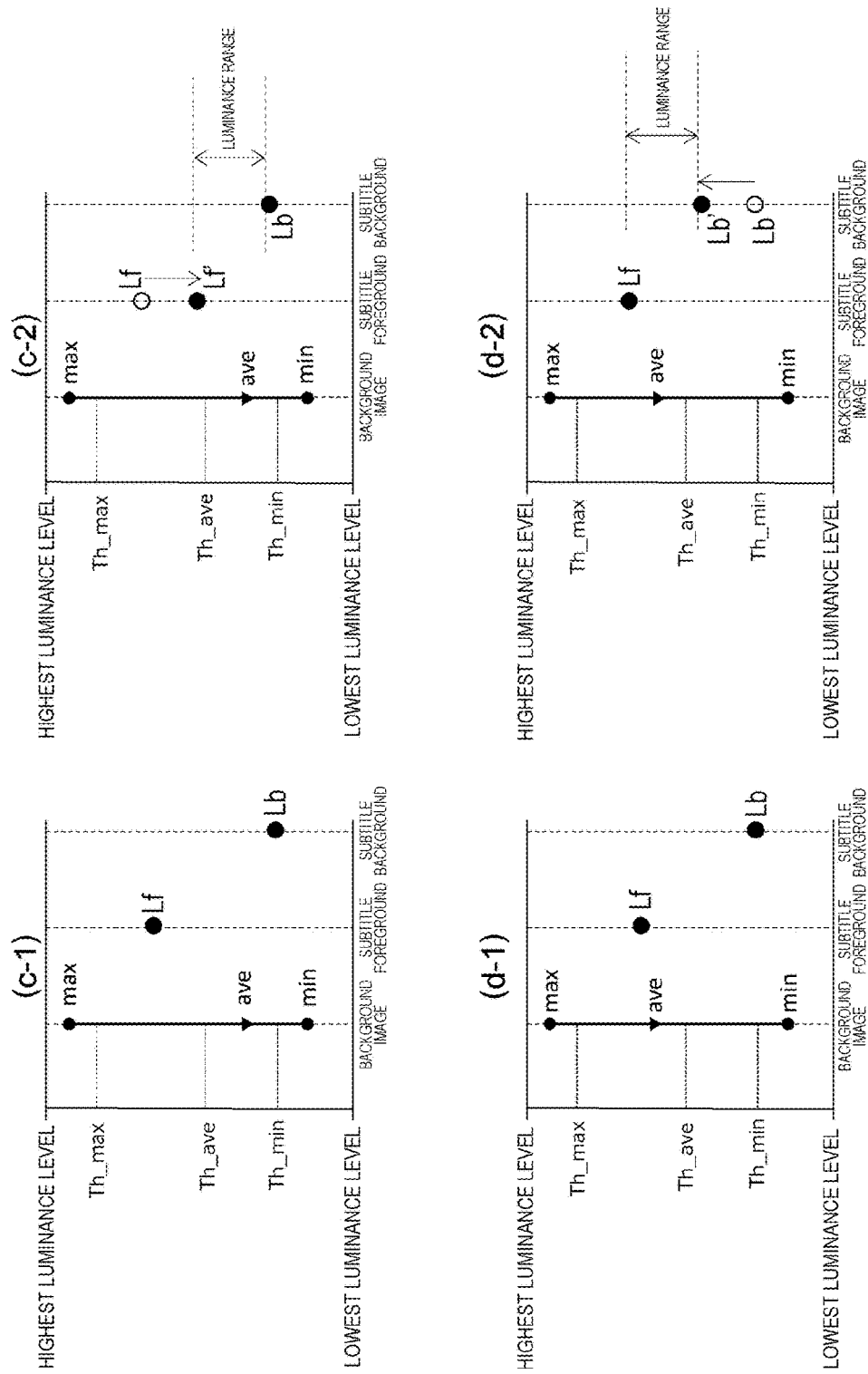
FIGS. 11(c-1) through 11(d-2) are diagrams for explaining subtitle luminance level adjustment in a dark scene with a high-luminance portion and a bright scene with a low-luminance portion.

In this case, as shown in FIG. 11(*c*-2), the luminance Lf in the foreground region of the subtitle is adjusted and lowered to a luminance Lf', and the luminance range is adjusted to satisfy the subtitle luminance range limit information "renderingdrange". That is, the level of the luminance Lf' is adjusted so that Lf'/Lb becomes equal to or lower than the ratio indicated by "renderingdrange".

Next, the subtitle luminance level adjustment in the "bright scene with a low-luminance portion" of type d shown in FIGS. 7(*d*-1) and 7(*d*-2) is described. The chart in FIG. 11(*d*-1) corresponds to FIG. 7(*d*-1). Since Th_max<max, it is determined that a region with a very high luminance exists in the background image. Also, since Th_ave<ave, the background image is determined to be bright overall. Further, since Th_min>min, it is determined that a region with a very low luminance exists in the background image. The luminance Lf in the foreground region of the subtitle and the luminance Lb in the background region of the subtitle are at the levels shown in the drawing.

In this case, as shown in FIG. 11(*d*-2), the luminance Lb in the background region of the subtitle is adjusted and increased to a luminance Lb', and the luminance range is adjusted to satisfy the subtitle luminance range limit information "renderingdrange". That is, the level of the luminance Lb' is adjusted so that Lf/Lb' becomes equal to or lower than the ratio indicated by "renderingdrange".

Next, subtitle luminance level adjustment with parameters for the respective partitions is described. The maximum luminance value, the minimum luminance value, and the average luminance value in the screen cannot indicate local luminance distribution. The maximum luminance values, the minimum luminance values, and the average luminance values of the respective partitions are used, so that more minute subtitle luminance level adjustment can be performed.

Figure 12:
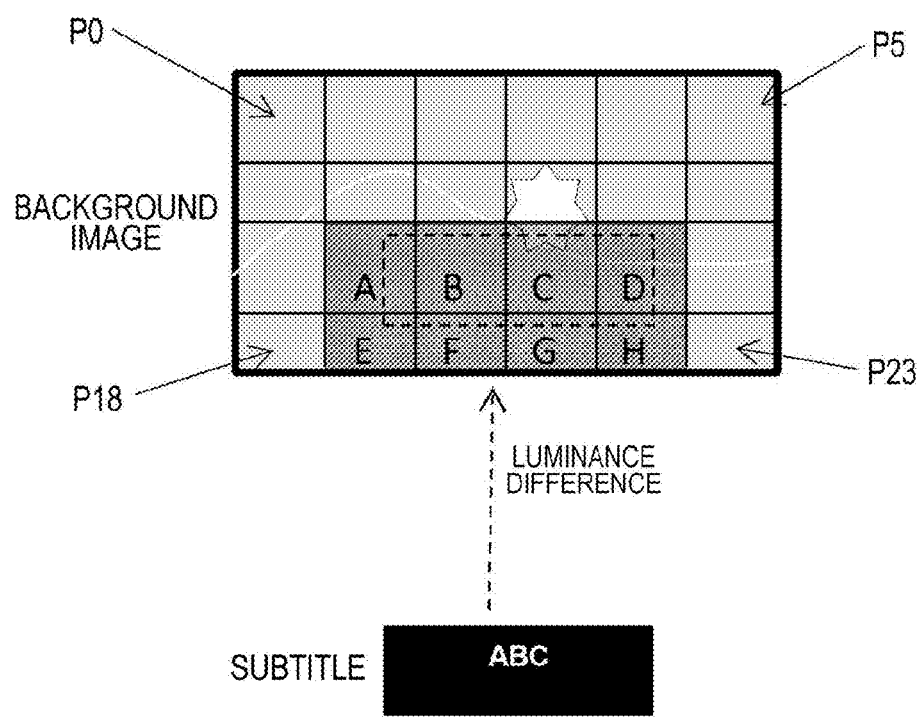
FIG. 12 is a diagram for explaining subtitle luminance level adjustment with parameters for the respective partitions.

Here, the screen is divided into the 24 partitions P0 through P23, and a subtitle is superimposed across eight partitions A, B, C, D, B, F, G, and H, as shown in FIG. 12. The dashed rectangle indicates the position and the size of the subtitle (a bordered subtitle) to be superimposed.

Figure 13:
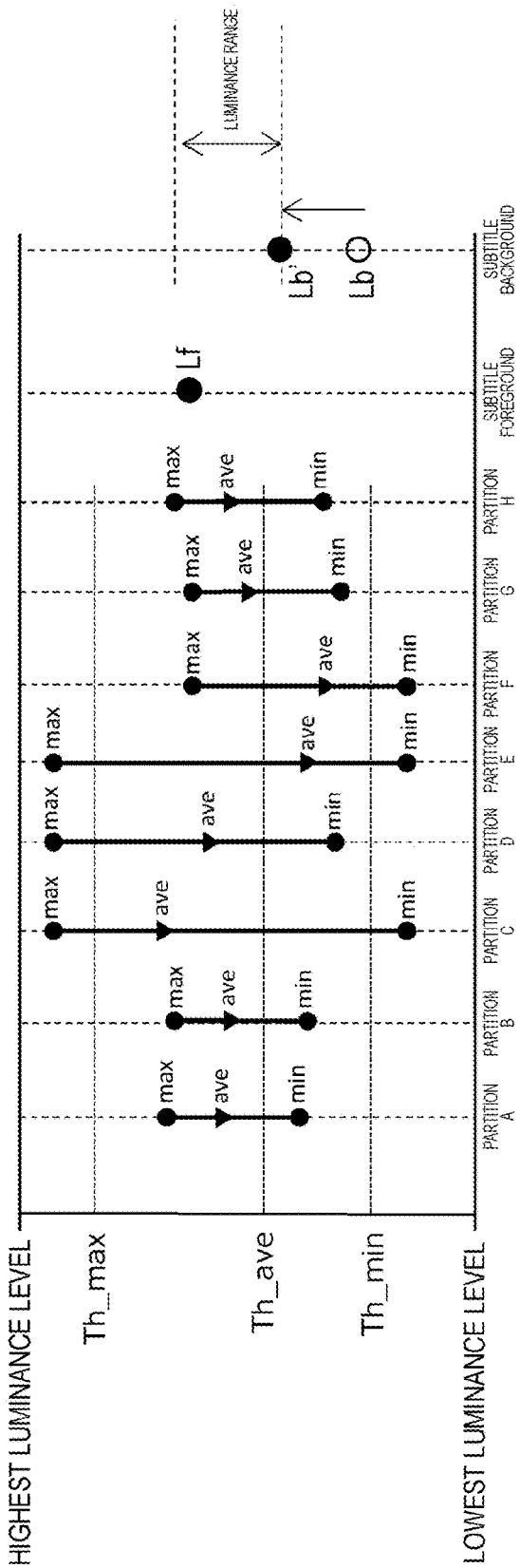
FIG. 13 is a diagram for explaining subtitle luminance level adjustment with parameters for the respective partitions.

As shown in FIG. 13, the maximum luminance values "partition_content_level_max", the minimum luminance values "partition_content_level_min", and the average luminance values "partition_content_level_ave" that correspond to the eight partitions A, B, C, D, E, F, G, and H are used in this case. It should be noted that the partitions in a larger area than the eight partitions may be included. Also, a high-luminance threshold value "Th_max", a low-luminance threshold value "Th_min", and an average-luminance threshold value "Th_ave" are used in this case. Further, the luminance "Lf" in the foreground region of the subtitle and the luminance "Lb" in the background region of the subtitle are used in this case.

In this case, for each partition, determinations similar to those in the subtitle luminance level adjustment with the above described parameters for the screen are made, and the final determinations are made in accordance with the rule of majority or degrees of priority, for example. In the example shown in the drawing, the determinations as to the partition C are employed (see FIGS. 11(*d*-1) and 11 (*d*-2)), for example. Specifically, the luminance Lb in the background region of the subtitle is adjusted and increased to a luminance Lb', and the luminance range is adjusted to satisfy the subtitle luminance range limit information "renderingdrange". That is, the level of the luminance Lb' is adjusted so that Lf/Lb' becomes equal to or lower than the ratio indicated by "renderingdrange".

[Example Configuration of the Transmission Device]

Figure 14:
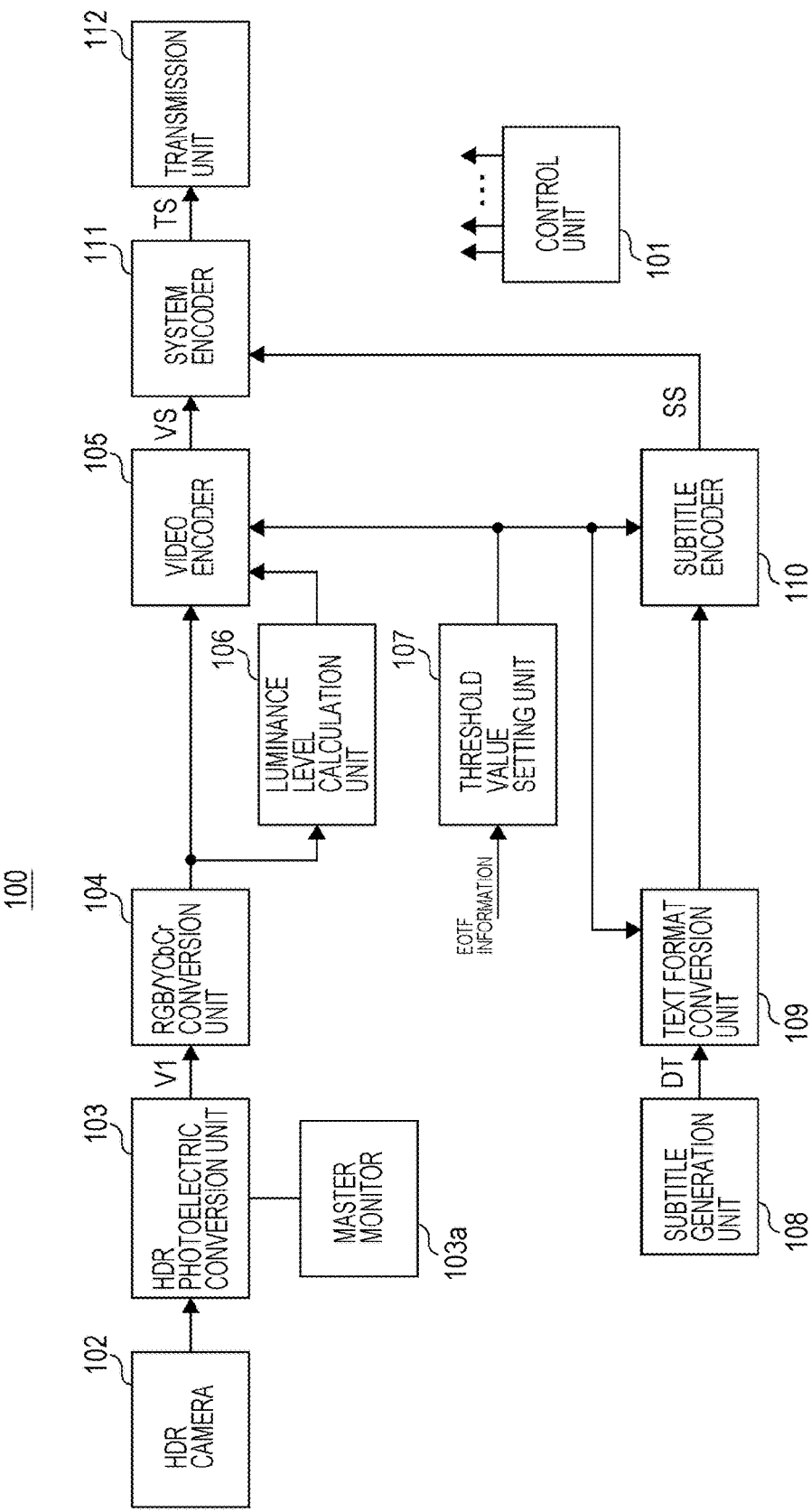
FIG. 14 is a block diagram showing an example configuration of a transmission device of the transmission/reception system.

FIG. 14 shows an example configuration of the transmission device 100. This transmission device 100 includes a control unit 101, an HDR camera 102, an HDR photoelectric conversion unit 103, an RGB/YCbCr conversion unit 104, a video encoder 105, a luminance level calculation unit 106, a threshold value setting unit 107, a subtitle generation unit 108, a text format conversion unit 109, a subtitle encoder 110, a system encoder 111, and a transmission unit 112.

The control unit 101 is designed to include a central processing unit (CPU), and controls operations of the respective components of the transmission device 100 in accordance with a control program. The HDR camera 102 images an object, and outputs high dynamic range (HDR) video data (image data). This HDR video data has a contrast ratio of 0 to 100%*N (N being a number greater than 1) exceeding the luminance of the white peak of a conventional SDR image, such as a contrast ratio of 0 to 1000%. Here, the 100% level is equivalent to the luminance value of white, which is 100 cd/m$^2$, for example.

A master monitor 103*a* is a monitor for grading the HDR video data obtained by the HDR camera 102. This master monitor 103*a* has a display luminance level corresponding to the HDR video data or suitable for grading the HDR video data.

The HDR photoelectric conversion unit 103 applies HDR opto-electric transfer function characteristics to the HDR video data obtained by the HDR camera 102, to acquire transmission video data V1. The RGB/YCbCr conversion unit 104 converts the transmission video data V1 from an RGB domain to a YCbCr (luminance/chrominance) domain.

In accordance with the transmission video data V1 converted to the YCbCr domain, the luminance level calculation unit 106 calculates, for each picture, the maximum luminance value "global_content_level_max", the minimum luminance value "global_content_level_min", and the average luminance value "global_content_level_ave" that correspond to the entire screen, and the maximum luminance values "partition_content_level_max", the minimum luminance values "partition_content_level_min", and the average luminance values "partition_content_level_ave" that correspond to the respective partition regions (partitions) obtained by dividing the screen by a predetermined number, for example.

Figure 15:
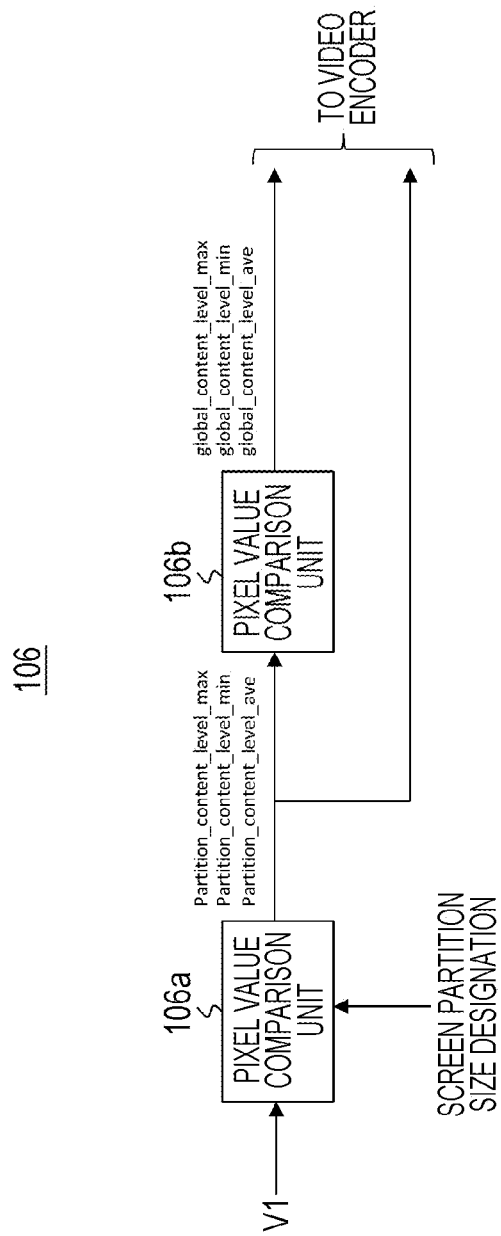
FIG. 15 is a block diagram showing an example configuration of a luminance level calculation unit.

FIG. 15 shows an example configuration of the luminance level calculation unit 106. This luminance level calculation unit 106 is formed with image value comparison units 106a and 106b. The pixel value comparison unit 106a receives an input of the transmission video data V1, and has a screen partition size designated by the control unit 101. It should be noted that, instead of a screen partition size, a screen partition number may be designated. The pixel value comparison unit 106a compares pixel values, to calculate the maximum luminance values "partition_content_level_max", the minimum luminance values "partition_content_level_min", and the average luminance values "partition_content_level_ave" for the respective partitions (partition regions).

The pixel value comparison unit 106b receives an input of the respective values of each partition calculated by the pixel value comparison unit 106a. The pixel value comparison unit 106b compares the values of the respective partitions, to calculate the maximum luminance value "global_content_level_max", the minimum luminance value "global_content_level_min", and the average luminance value "global_content_level_ave" that correspond to the entire screen.

Referring back to FIG. 14, in accordance with electro-optical transfer function characteristics (EOTF characteristics), the threshold value setting unit 107 sets a high-luminance threshold value "Th_max", a low-luminance threshold value "Th_min", and an average-luminance threshold value "Th_ave" for determining how the subtitle luminance is to be adjusted on the reception side (see FIG. 4).

The video encoder 105 performs encoding such as MPEG4-AVC or HEVC on the transmission video data V1, to generate a video stream (PES stream) VS containing the encoded image data. The video encoder 105 also inserts the luminance level adjustment information for adjusting the luminance level of the subtitle into the video stream.

Specifically, the maximum luminance value "global_content_level_max", the minimum luminance value "global_content_level_min", and the average luminance value "global_content_level_ave" that have been calculated by the luminance level calculation unit 106 and correspond to the entire screen are inserted into the video stream, and the maximum luminance values "partition_content_level_max", the minimum luminance values "partition_content_level_min", and the average luminance values "partition_content_level_ave" that have been calculated by the luminance level calculation unit 106 and correspond to the respective partitions are also inserted into the video stream. The high-luminance threshold value "Th_max", the low-luminance threshold value "Th_min", and the average-luminance threshold value "Th_ave" that have been set by the threshold value setting unit are also inserted into the video stream.

In this embodiment, the video encoder 105 inserts a luma dynamic range SEI message "Luma_dynamic_range SEI message" that is newly defined, into an "SEIs" portion of each access unit (AU).

Figure 16:
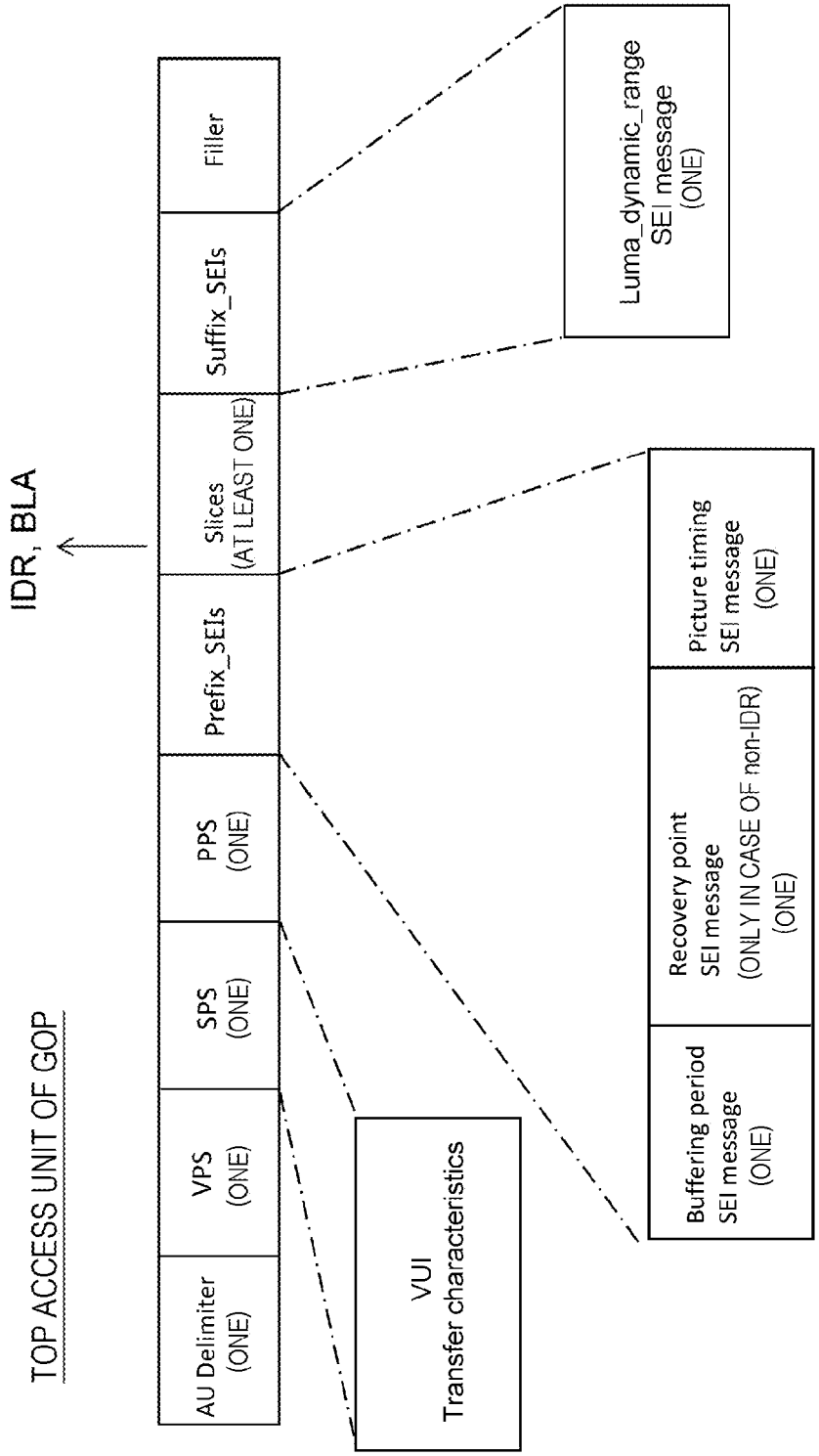
FIG. 16 is a diagram showing the top access unit of a GOP in a case where the encoding method is HEVC.
Figure 17:
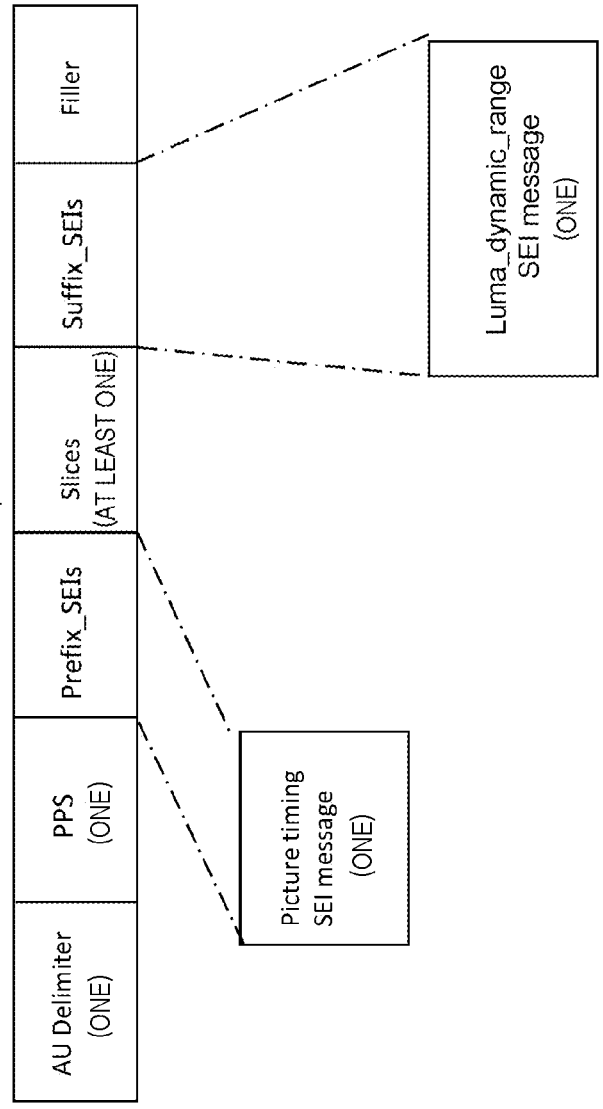
FIG. 17 is a diagram showing an access unit other than the top access unit of a GOP in a case where the encoding method is HEVC.

FIG. 16 shows the top access unit of a group of pictures (GOP) in a case where the encoding method is HEVC. FIG. 17 shows an access unit other than the top access unit of a GOP in a case where the encoding method is HEVC. In a case where the encoding method is HEVC, SEI messages "Prefix_SEIs" for decoding are disposed before the slices "slices" in which pixel data is encoded, and SEI messages "Suffix_SEIs" for display are disposed after the slices "slices". As shown in FIGS. 16 and 17, the luma dynamic range SEI message may be disposed as the SEI messages "Suffix_SEIs".

FIGS. 18 and 19 show an example structure (Syntax) of the luma dynamic range SEI message. FIG. 20 shows the contents (Semantics) of the principal information in the example structure. The flag information represented by the one bit of "Luma_dynamic_range_cancel_flag" indicates whether to refresh the message in "Luma_dynamic_range". Specifically, "0" indicates that the message in "Luma_dynamic_range" is to be refreshed. On the other hand, "1" indicates that the message in "Luma_dynamic_range" is not to be refreshed, or the previous message is to be maintained as it is.

When "Luma_dynamic_range_cancel_flag" is "0", there are the fields described below. The 8-bit field of "coded_data_bit_depth" indicates the number of encoded pixel bits. The 8-bit field of "number_of_partitions" indicates the number of partition regions (partitions) in the screen. If this value is smaller than "2", the screen is not divided. The 8-bit field of "block_size" indicates the block size, or the size of the regions obtained by dividing the entire screen by the number of partition regions.

The 16-bit field of "global_content_level_max" indicates the maximum luminance value in the entire screen. The 16-bit field of "global_content_level_min" indicates the minimum luminance value in the entire screen. The 16-bit field of "global_content_level_ave" indicates the average luminance value in the entire screen. The 16-bit field of "content_threshold_max" indicates the high-luminance threshold value. The 16-bit field of "content_threshold_min" indicates the low-luminance threshold value. The 16-bit field of "content_threshold_ave" indicates the average-luminance threshold value.

Further, when the number of partitions indicated by the field of "number_of_partitions" is 2 or greater, each partition contains the fields described below. The 16-bit field of "partition_content_level_max" indicates the maximum luminance value in the partition. The 16-bit field of "partition_content_level_min" indicates the minimum luminance value in the partition. The 16-bit field of "partition_content_level_ave" indicates the average luminance value in the partition.

Referring back to FIG. 14, the subtitle generation unit 108 generates text data (a character code) DT as subtitle information. The text format conversion unit 109 receives an input of the text data DT, and obtains subtitle text information in a predetermined format having display timing information. In this embodiment, the text data DT is converted into TTML.

FIG. 21 shows a TTML structure. TTML is written in accordance with XML. The header "head" contains the respective elements such as metadata "metadata", styling "styling", and layout "layout". FIG. 22(a) shows an example structure of the metadata (TTM: TTML Metadata). This metadata includes information about the title of the metadata and the information about the copyright.

FIG. 22(b) shows an example structure of the styling (TTS: TTML Styling). This styling includes not only an identifier "id" but also information about the color "color", the font "fontFamily", the size "fontSize", the alignment "textAlign", and the like. FIG. 22(c) shows an example structure of the layout (region: TTML layout). This layout includes not only the identifier "id" of the region where the subtitle is disposed, but also information about the extent "extent", the offset "padding", the background color "backgroundColor", the alignment "displayAlign", and the like.

FIG. 23 shows an example structure of the body "body". The example shown in the drawing includes information about three subtitles: subtitle 1 "subtitle 1", subtitle 2 "subtitle 2", and subtitle 3 "subtitle 3". For each subtitle, text data as well as the display start timing and the display end timing are written. As for subtitle 1 "subtitle 1", for example, the display start timing is "0.76 s", the display end timing is "3.45 s", and the text data is "It seems a paradox, dose it not,".

Referring back to FIG. 14, the subtitle encoder 110 converts the TTML obtained by the text format conversion unit 109 into various segments, and generates a subtitle stream SS formed with a PES packet having these segments disposed in payloads.

In this embodiment, the luminance level adjustment information for adjusting the luminance level of the subtitle is inserted into the subtitle stream SS. Specifically, the high-luminance threshold value "Th_max", the low-luminance threshold value "Th_min", the average-luminance threshold value "Th_ave", the subtitle luminance range limit information "renderingdrange", and the subtitle color space information "colorspace" are inserted into the subtitle stream SS.

The insertion of the luminance level adjustment information is performed by the text format conversion unit 109 or the subtitle encoder 110. In a case where the text format conversion unit 109 performs the insertion of the luminance level adjustment information, the elements in the metadata "metadata" in the header of the TTML structure are used, for example.

FIG. 24 shows an example structure of the metadata (TTM: TTML Metadata) in that case. The color space information is indicated by "ttm-ext:colorspace", and "ITUR2020", "ITIUR709", or the like is then written. In the example shown in the drawing, "ITUR2020" is written. Dynamic range information, or the type of the EOTF characteristics of HDR, is indicated by "ttm-ext:dynamicrange", and "ITUR202x", "ITIUR709", or the like is then written. In the example shown in the drawing, "ITUR202x" is written.

Rendering control information as the luminance level adjustment information is indicated by "ttm-ext:renderingcontrol". The high-luminance threshold value is indicated by "ttm-ext:lumathmax", and "Th_max" as the actual value thereof is then written. The low-luminance threshold value is indicated by "ttm-ext:lumathmin", and "Th_min" as the actual value thereof is then written. The average-luminance threshold value is indicated by "ttm-ext:lumathave", and "Th_ave" as the actual value thereof is then written.

The subtitle luminance range limit information is indicated by "ttm-ext:renderingdrange", and "Maxminratio" is then written. "Maxminratio" indicates the ratio obtained by dividing the maximum luminance value of a subtitle by the minimum luminance value of the subtitle. When this value is "4", for example, the maximum luminance value of the subtitle after luminance adjustment is equal to or lower than four times the minimum luminance value.

Further, In a case where the text format conversion unit 109 performs the insertion of the luminance level adjustment information, the elements in the styling extension "styling extension" in the header of the TTML structure are used, for example. In this case, independent rendering control (luminance level adjustment) can be performed for each "xml:id".

FIG. 25 shows an example structure of the styling extension "TTML Styling Extension" in that case. The color space information is indicated by "ttse:colorspace", and "ITUR2020", "ITIUR709", or the like is then written. In the example shown in the drawing, "ITUR2020" is written. Dynamic range information, or the type of the EOTF characteristics of HDR, is indicated by "ttse:dynamicrange", and "ITUR202x", "ITIUR709", or the like is then written. In the example shown in the drawing, "ITUR202x" is written.

The high-luminance threshold value is indicated by "ttse:renderingcontrol:lumathmax", and "Th_max" as the actual value thereof is then written. The low-luminance threshold value is indicated by "ttse:renderingcontrol:lumathmin", and "Th_min" as the actual value thereof is then written. The average-luminance threshold value is indicated by "ttse:renderingcontrol:lumathave", and "Th_ave" as the actual value thereof is then written. The subtitle luminance range limit information is indicated by "ttse:renderingcontrol:renderingdrange", and "Maxminratio" is then written.

In a case where the subtitle encoder 110 performs the insertion of the luminance level adjustment information, a segment containing the luminance level adjustment information are inserted into the subtitle stream. In this embodiment, a newly-defined subtitle rendering control segment (SRCS: Subtitle rendering control segment) is inserted into the subtitle stream.

FIG. 26 shows an example structure (syntax) of the subtitle rendering control segment. This structure includes the following pieces of information: "sync_byte", "segment_type", "page_id", "segment_length", "version_number", and "number_of_resion". The 8-bit field of "segment_type" indicates the segment type, and, in this example, shows that the segment is a subtitle rendering control segment. The 8-bit field of "segment_length" indicates the length (size) of the segment. The 8-bit field of "number_of_resion" indicates the number of regions.

Also, this structure includes the luminance level adjustment information for each region. The 8-bit field of "resion_id" indicates the identifier for identifying the region. The 8-bit field of "colorspace_type" indicates the color space information. The 8-bit field of "dynamicrange_type" indicates the dynamic range information, or indicates the type of the EOTF characteristics of HDR. The 16-bit field of "luma_th_max" indicates the high-luminance threshold value. The 16-bit field of "luma_th_min" indicates the low-luminance threshold value. The 16-bit field of "luma_th_ave" indicates the average-luminance threshold value.

The 8-bit field of "renderingdrange" indicates the subtitle luminance range limit information. This limit information indicates the ratio obtained by dividing the maximum luminance value of a subtitle by the minimum luminance value of the subtitle, for example. When this value is "4", for example, the maximum luminance value of the subtitle after luminance adjustment is equal to or lower than four times the minimum luminance value.

Referring back to FIG. 14, the system encoder 111 generates a transport stream TS including the video stream VS generated by the video encoder 105 and the subtitle stream SS generated by the subtitle decoder 110. The transmission unit 112 incorporates this transport stream TS into broadcast waves or a network packet, and transmits the broadcast waves or the network packet to the reception device 200.

The system encoder 111 inserts identification information into the transport stream TS serving as a container. The identification information indicates that the luminance level adjustment information has been inserted into the video stream. In this embodiment, the system encoder 111 inserts an HDR rendering support descriptor "HDR_rendering_support_descriptor" into a program map table (PMT: Program Map Table).

FIG. 27(a) shows an example structure (Syntax) of the HDR rendering support descriptor. FIG. 27(b) shows the contents (Semantics) of the principal information in the example structure. The 8-bit field of "descriptor_tag" indicates the descriptor type, and, in this example, shows that the descriptor is an HDR rendering support descriptor. The 8-bit field of "descriptor_length" indicates the length (size) of the descriptor, and shows the number of the bytes that follow as the length of the descriptor.

The flag "HDR_flag" indicates whether the service stream (video stream) is compatible with HDR. When the flag is "1", the service stream is compatible with HDR. When the flag is "0", the service stream is not compatible with HDR. The flag "composition_control_flag" indicates whether the luma dynamic range SEI message (Luma_dynamic_Range SEI message) has been encoded in the video stream, or whether the luminance level adjustment information has been inserted into the video stream. When the flag is "1", the luma dynamic range SEI message has been encoded. When the flag is "0", the luma dynamic range SEI message has not been encoded. The 8-bit field of "EOTF_type" indicates the type of the EOTF characteristics of the video (the value of the VUI of the video stream).

The system encoder 111 inserts further identification information into the transport stream TS serving as a container. The identification information indicates that the luminance level adjustment information has been inserted into the subtitle stream. In this embodiment, the system encoder 111 inserts a subtitle rendering metadata descriptor "Subtitle_rendering_metadata_descriptor" into the program map table (PMT: Program Map Table).

FIG. 28(a) shows an example structure (Syntax) of the subtitle rendering metadata descriptor. FIG. 28(b) shows the contents (Semantics) of the principal information in the example structure. The 8-bit field of "descriptor_tag" indicates the descriptor type, and, in this example, shows that the descriptor is a subtitle rendering metadata descriptor. The 8-bit field of "descriptor_length" indicates the length (size) of the descriptor, and shows the number of the bytes that follow as the length of the descriptor.

The flag "subtitle_text_flag" indicates whether subtitle is transmitted in the form of a text code. When the flag is "1", the subtitle is a text-encoded subtitle. When the flag is "0", the subtitle is not a text-encoded subtitle. The flag "subtitle_rendering_control_flag" indicates whether the luminance adjustment meta-information about the subtitle has been encoded, or whether the subtitle has the luminance level adjustment information inserted therein. When the flag is "1", the luminance adjustment meta-information has been encoded. When the flag is "0", the luminance adjustment meta-information has not been encoded.

The 3-bit field of "meta_container_type" indicates the storage site or the insertion position of the luminance adjustment meta-information (luminance level adjustment information). In the 3-bit field of "meta_container_type", "0" indicates the subtitle rendering control segment, "1" indicates an element in the metadata "metadata" in the header of the TTML structure, and "2" indicates an element in the styling extension "styling extension" in the header of the TTML structure.

Operations in the transmission device 100 shown in FIG. 14 are now briefly described. HDR video data obtained through imaging performed by the HDR camera 102 is supplied to the HDR photoelectric conversion unit 103. The HDR video data obtained by the HDR camera 102 is graded with the master monitor 103a. The HDR photoelectric conversion unit 103 performs photoelectric conversion by applying HDR opto-electric transfer function characteristics (an HDR OETF curve) to the HDR video data, and thus obtains transmission video data V1. This transmission video data V1 is converted from an RGB domain to a YCbCr (luminance/chrominance) domain by the RGB/YCbCr conversion unit 104.

The transmission video data V1 converted to the YCbCr domain is supplied to the video encoder 105 and the luminance level calculation unit 106. The luminance level calculation unit 106 calculates, for each picture, the maximum luminance value "global_content_level_max", the minimum luminance value "global_content_level_min", and the average luminance value "global_content_level_ave" that correspond to the entire screen, and the maximum luminance values "partition_content_level_max", the minimum luminance values "partition_content_level_min", and the average luminance values "partition_content_level_ave" that correspond to the respective partition regions (partitions) obtained by dividing the screen by a predetermined number (see FIG. 15). The respective calculated values are supplied to the video encoder 105.

Information about the electro-optical transfer function characteristics (EOTF characteristics) is supplied to the threshold value setting unit 107. In accordance with the EOTF characteristics, the threshold value setting unit 107 sets the high-luminance threshold value "Th_max", the low-luminance threshold value "Th_min", and the average-luminance threshold value "Th_ave" for determining how the subtitle luminance is to be adjusted on the reception side (see FIG. 4). The respective set values are supplied to the video encoder 105. The respective set values are also supplied to the text format conversion unit 109 or the subtitle encoder 110.

At the video encoder 105, encoding such as MPEG4-AVC or HEVC is performed on the transmission video data V1, and a video stream (PES stream) VS containing encoded image data is generated. At the video encoder 105, the luminance level adjustment information for adjusting the luminance level of the subtitle is also inserted into the video stream. That is, at the video encoder 105, a newly-defined luma dynamic range SEI message is inserted into a portion of "SEIs" in an access unit (AU) (see FIG. 16).

At the subtitle generation unit 108, text data (a character code) DT is generated as subtitle information. This text data DT is supplied to the text format conversion unit 109. At the text format conversion unit 109, the text data DT is converted into subtitle text information having display timing information, or into TTML (see FIG. 21). This TTML is supplied to the subtitle encoder 110.

At the subtitle encoder 110, the TTML obtained by the text format conversion unit 109 is converted into various segments, and a subtitle stream SS formed with a PES packet having these segments disposed in payloads is generated.

The luminance level adjustment information for adjusting the luminance level of the subtitle is inserted into the subtitle stream SS. The insertion of the luminance level adjustment information is performed by the text format conversion unit 109 or the subtitle encoder 110. In a case where the insertion is performed by the text format conversion unit 109, the elements in the metadata "metadata" in the header of the TTML structure or the elements in the styling extension "styling extension" in the header of the TTML structure are used, for example (see FIGS. 24 and 25). In a case where the insertion is performed by the subtitle encoder 110, on the other hand, a newly-defined subtitle rendering control segment is inserted into the subtitle stream, for example (see FIG. 26).

The video stream VS generated by the video encoder 105 is supplied to the system encoder 111. The subtitle stream SS generated by the subtitle encoder 110 is supplied to the system encoder 111. At the system encoder 111, a transport stream TS including the video stream VS and the subtitle stream SS is generated. This transport stream TS is incorporated into broadcast waves or a network packet, and is transmitted to the reception device 200 by the transmission unit 112.

At the system encoder 111 in this stage, identification information indicating that the video stream has the luminance level adjustment information inserted therein is inserted into the transport stream TS. That is, at the system encoder 111, an HDR rendering support descriptor is inserted into the program map table (PMT) (see FIG. 27(*a*)). At the system encoder 111, identification information indicating that the subtitle stream SS has the luminance level adjustment information inserted therein is also inserted into the transport stream TS. That is, at the system encoder 111, a subtitle rendering metadata descriptor is inserted into the program map table (PMT) (see FIG. 28(*a*)).

[Structure of the Transport Stream TS]

Figure 29:
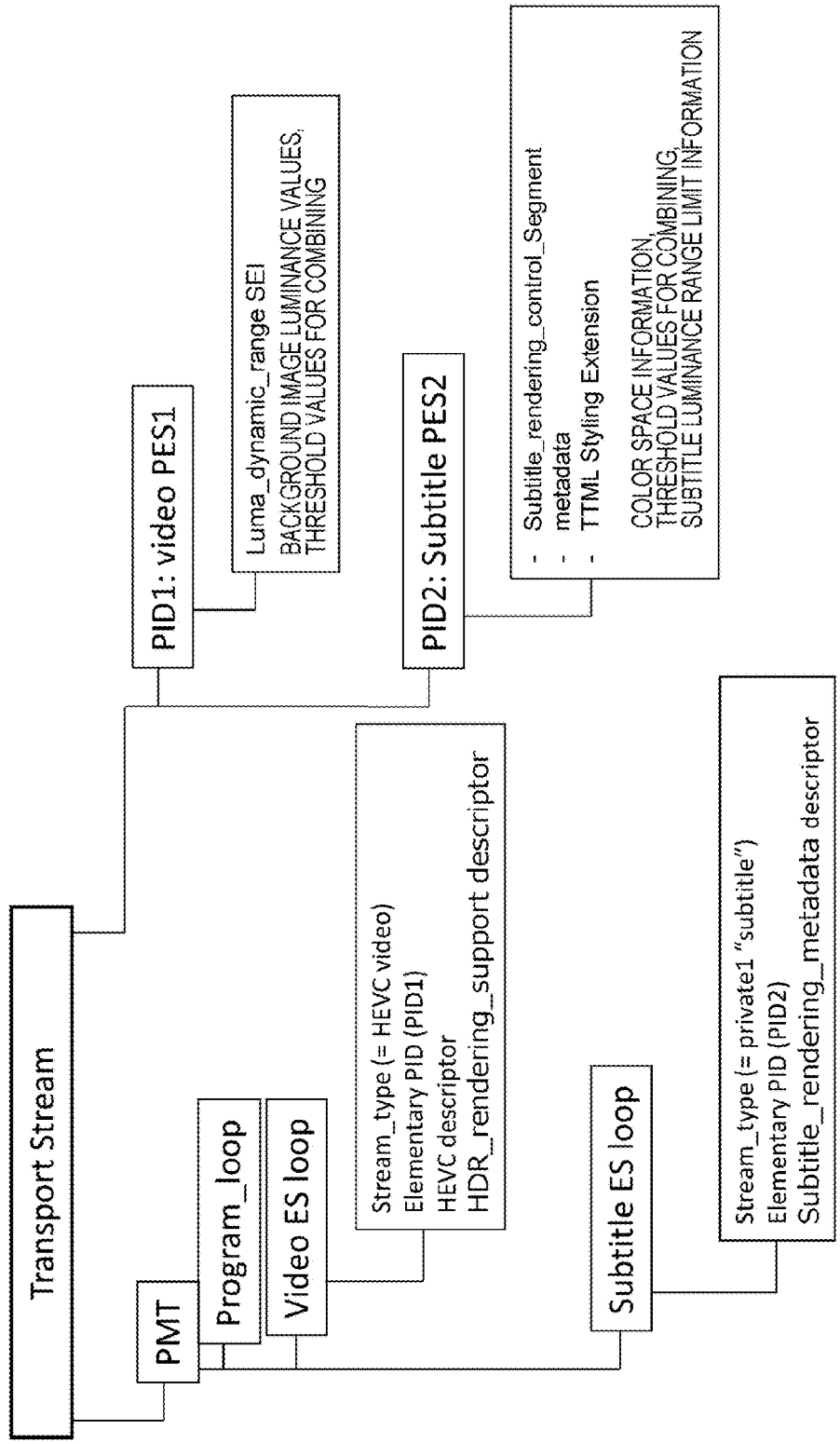
FIG. 29 is a chart showing an example structure of a transport stream TS.

FIG. 29 is a chart showing an example structure of the transport stream TS. This example structure includes a video stream PES packet "video PES1" that is identified by PID1. Each access unit has a luma dynamic range SEI message inserted therein. The luminance level adjustment information (background image luminance values, threshold values for combining, and the like) is written in the luma dynamic range SEI message.

This example structure also includes a subtitle stream PES packet "Subtitle PES2" that is identified by PID2. The luminance level adjustment information (color space information, threshold values for combining, subtitle luminance range limit information, and the like) is inserted into an element of the metadata "metadata" in the header of the TTML structure, an element of the styling extension "styling extension" in the header of the TTML structure, or the subtitle rendering control segment.

The transport stream TS also includes the program map table (PMT) as program specific information (PSI). The PSI is the information indicating to which programs the respective elementary streams included in the transport stream belong. The PMT includes a program loop "Program loop" in which information related to the entire program is written.

The PMT also includes elementary stream loops having information related to the respective elementary streams. This example structure includes a video elementary stream loop "video ES loop" corresponding to the video stream, and a subtitle elementary stream loop "Subtitle ES loop" corresponding to the subtitle stream.

In the video elementary stream loop "video ES loop", information such as the stream type and the packet identifier (PID) corresponding to the video stream is disposed, and a descriptor that describes information related to the video stream is also disposed. The value of "Stream_type" of this video stream is set at a value indicating an HEVC video stream, for example, and the PID information indicates PID1 allotted to the video stream PES packet "video PES1". An HEVC descriptor, a newly-defined HDR rendering support descriptor, or the like is inserted as the descriptor.

In the subtitle elementary stream loop "Subtitle ES loop", information such as the stream type and the packet identifier (PID) corresponding to the subtitle stream is disposed, and a descriptor that describes information related to the subtitle stream is also disposed. The value of "Stream type" of this subtitle stream is set at a value indicating a private stream, for example, and the PID information indicates PID2 allotted to the subtitle stream PES packet "Subtitle PES2". A newly-defined subtitle rendering metadata descriptor or the like is inserted as the descriptor.

[Example Configuration of the Reception Device]

Figure 30:
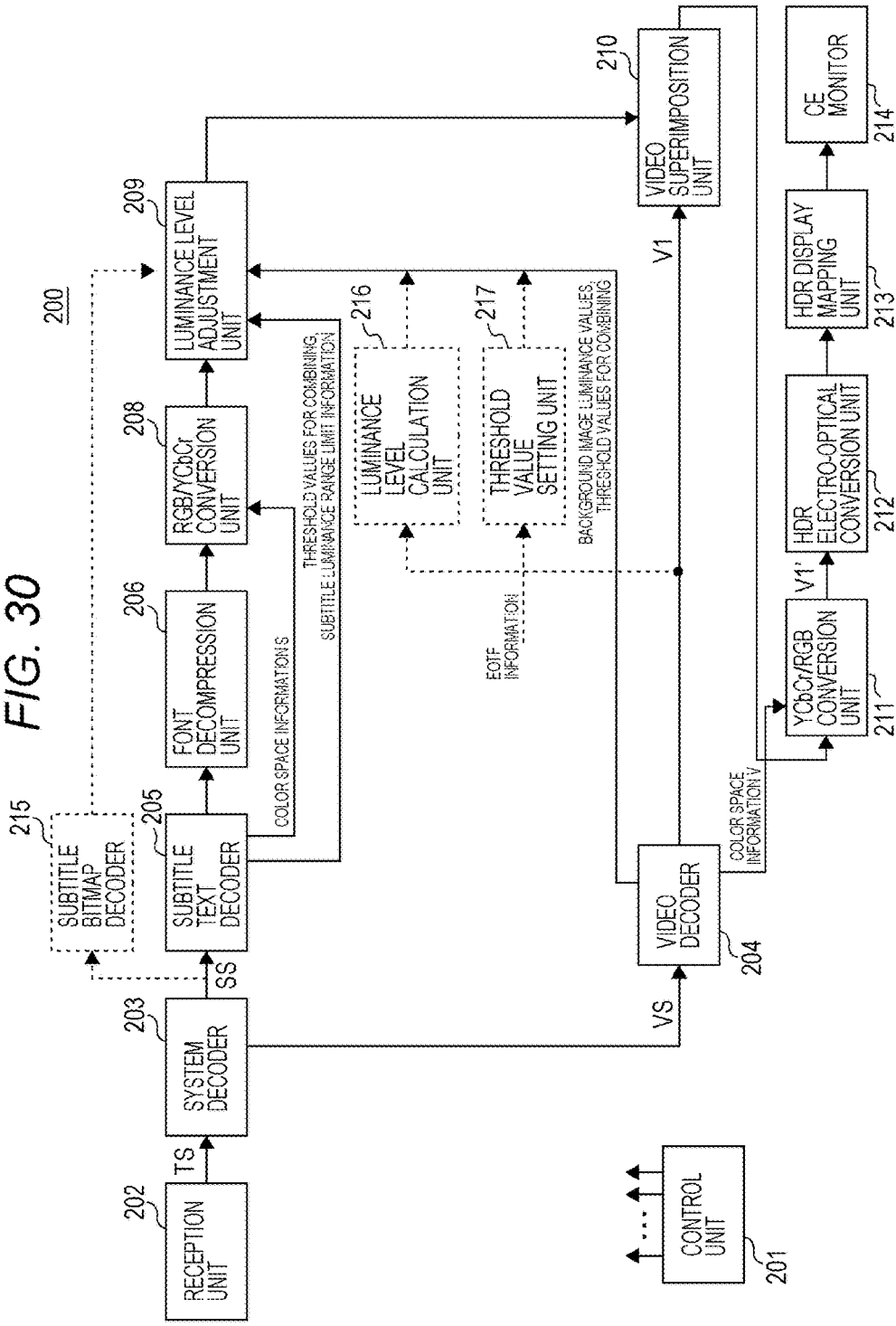
FIG. 30 is a block diagram showing an example configuration of a reception device of the transmission/reception system.

FIG. 30 shows an example configuration of the reception device 200. This reception device 200 includes a control unit 201, a reception unit 202, a system decoder 203, a video decoder 204, a subtitle text decoder 205, a font decompression unit 206, an RGB/YCbCr conversion unit 208, and a luminance level adjustment unit 209. This reception device 200 also includes a video superimposition unit 210, a YCbCr/RGB conversion unit 211, an HDR electro-optical conversion unit 212, an HDR display mapping unit 213, and a CE monitor 214.

The control unit 201 is designed to include a central processing unit (CPU), and controls operations of the respective components of the reception device 200 in accordance with a control program. The reception unit 202 receives the transport stream TS in broadcast waves or a network packet transmitted from the transmission device 100. The system decoder 203 extracts the video stream VS and the subtitle stream SS from the transport stream TS. The system decoder 203 also extracts various kinds of information inserted in the transport stream TS (container), and sends the extracted information to the control unit 201.

In this embodiment, this extracted information includes an HDR rendering support descriptor (see FIG. 27(*a*) and a subtitle rendering metadata descriptor (see FIG. 28(*a*)).

As the flag "HDR_flag" in the HDR rendering support descriptor is "1", the control unit 201 recognizes that the video stream (service stream) is compatible with HDR. As the flag "composition_control_flag" in the HDR rendering support descriptor is "1", the control unit 201 also recognizes that an encoded luma dynamic range SEI message is included in the video stream, or the video stream has the luminance level adjustment information inserted therein.

As the flag "subtitle_text_flag" in the subtitle rendering metadata descriptor is "1", the control unit 201 also recognizes that the subtitle is transmitted in the form of a text code. As the flag "subtitle_rendering_control_flag" in the subtitle rendering metadata descriptor is "1", the control unit 201 also recognizes that the luminance adjustment meta-information about the subtitle has been encoded, or the subtitle has the luminance level adjustment information inserted therein.

The video decoder 204 performs a decoding process on the video stream VS extracted by the system decoder 203, and outputs the transmission video data V1. The video decoder 204 also extracts the parameter sets and the SEI messages inserted in the respective access units constituting the video stream VS, and sends necessary information to the control unit 201.

In this embodiment, the control unit 201 recognizes that the video stream includes an encoded luma dynamic range SEI message as described above. Thus, under the control of the control unit 201, the video decoder 204 also extracts the SEI message without fail, and obtains the luminance level adjustment information such as background image luminance values and threshold values for combining.

The subtitle text decoder 205 performs a decoding process on the segment data of the respective regions in the subtitle stream SS, and thus obtains the text data and the control codes of the respective regions. The subtitle text decoder 205 also obtains, from the subtitle stream SS, the luminance level adjustment information such as the color space information, the threshold values for combining, and the subtitle luminance range limit information. In this embodiment, the control unit 201 recognizes that the subtitle luminance adjustment meta-information has been encoded as described above. Thus, under the control of the control unit 201, the subtitle text decoder 205 obtains the luminance level adjustment information without fail.

The font decompression unit 206 performs font decompression in accordance with the text data and the control codes of the respective regions obtained by the subtitle segment decoder 302, and thus obtains the bitmap data of the respective regions. The RGB/YCbCr conversion unit 208 converts the bitmap data from an RGB domain to a YCbCr (luminance/chrominance) domain. In this case, the RGB/YCbCr conversion unit 208 performs the conversion using a conversion equation suitable for the color space, in accordance with the color space information.

The luminance level adjustment unit 209 performs luminance level adjustment on the subtitle bitmap data converted to the YCbCr domain, using the background image luminance values, the threshold values for combining, and the subtitle luminance range limit information. In this case, subtitle luminance level adjustment with the global parameters for the screen (see FIG. 8), or subtitle luminance level adjustment with the parameters for each partition (see FIG. 12) is performed.

The video superimposition unit 210 superimposes the bitmap data of the respective regions having the luminance levels adjusted by the luminance level adjustment unit 209, on the transmission video data V1 obtained by the video decoder 204. The YCbCr/RGB conversion unit 211 converts the transmission video data V1' having the bitmap data superimposed thereon from the YCbCr (luminance/chrominance) domain to a RGB domain. In this case, the YCbCr/RGB conversion unit 211 performs the conversion using a conversion equation suitable for the color space, in accordance with the color space information.

The HDR electro-optical conversion unit 212 applies HDR electro-optical transfer function characteristics to the transmission video data V1' converted to the RGB domain, and thus obtains display video data for displaying an HDR image. The HDR display mapping unit 213 performs display luminance adjustment on the display video data, in accordance with the maximum luminance display capability or the like of the CE monitor 214. The CE monitor 214 displays an HDR image in accordance with the display video data on which the display luminance adjustment has been performed. This CE monitor 214 is formed with a liquid crystal display (LCD) or an organic electroluminescence (EL) display, for example.

Operations in the reception device 200 shown in FIG. 30 are now briefly described. At the reception unit 202, the transport stream TS in broadcast waves or a network packet transmitted from the transmission device 100 is received. This transport stream TS is supplied to the system decoder 203. At the system decoder 203, the video stream VS and the subtitle stream SS are extracted from the transport stream TS.

At the system decoder 203, various kinds of information inserted in the transport stream TS (container) are also extracted, and are sent to the control unit 201. This extracted information includes an HDR rendering support descriptor (see FIG. 27(*a*)) and a subtitle rendering metadata descriptor (see FIG. 28(*a*)).

As the flag "HDR_flag" in the HDR rendering support descriptor is "1", the control unit 201 recognizes that the video stream (service stream) is compatible with HDR. As the flag "composition_control_flag" in the HDR rendering support descriptor is "1", the control unit 201 also recognizes that luma dynamic range SEI message in the video stream has been encoded.

As the flag "subtitle_text_flag" in the subtitle rendering metadata descriptor is "1", the control unit 201 also recognizes that the subtitle is transmitted in the form of a text code. As the flag "subtitle_rendering_control_flag" in the subtitle rendering metadata descriptor is "1", the control unit 201 also recognizes that the luminance adjustment meta-information about the subtitle has been encoded.

The video stream VS extracted by the system decoder 203 is supplied to the video decoder 204. At the video decoder 204, a decoding process is performed on the video stream VS, and the transmission video data V1 is obtained. At the video decoder 204, the luma dynamic range SEI message is also extracted from the video stream VS, and the luminance level adjustment information such as the background image luminance values and the threshold values for combining is obtained.

The subtitle stream SS extracted by the system decoder 203 is supplied to the subtitle text decoder 205. At the subtitle text decoder 205, a decoding process is performed on the segment data of the respective regions included in the subtitle stream SS, and the text data and the control codes of the respective regions are obtained. At the subtitle text decoder 205, the luminance level adjustment information such as the color space information, the threshold values for combining, and the subtitle luminance range limit information is also obtained from the subtitle stream SS.

The text data and the control codes of the respective regions are supplied to the font decompression unit 206. At the font decompression unit 206, font decompression is performed in accordance with the text data and the control codes of the respective regions, and the bitmap data of the respective regions is obtained. At the RGB/YCbCr conversion unit 208, this bitmap data is converted from an RGB domain to a YCbCr domain in accordance with color space information S, and is supplied to the luminance level adjustment unit 209.

At the luminance level adjustment unit 209, luminance level adjustment is performed on the bitmap data of the respective regions converted to the YCbCr domain, in accordance with the background image luminance values, the threshold values for combining, and the subtitle luminance range limit information. In this case, subtitle luminance level adjustment with the global parameters for the screen (see FIG. 8), or subtitle luminance level adjustment with the parameters for each partition (see FIG. 12) is performed.

The transmission video data V1 obtained by the video decoder 204 is supplied to the video superimposition unit 210. The bitmap data of the respective regions that has been subjected to the luminance level adjustment and been obtained by the luminance level adjustment unit 209 is supplied to the video superimposition unit 209. At the video superimposition unit 210, the bitmap data of the respective regions is superimposed on the transmission video data V1.

The transmission video data V1' that has been obtained by the video superimposition unit 210 and has the bitmap data superimposed thereon is converted from the YCbCr (luminance/chrominance) domain to an RGB domain at the YCbCr/RGB conversion unit 211 in accordance with the designation indicated by color space information V, and is then supplied to the HDR electro-optical conversion unit 212. At the HDR electro-optical conversion unit 212, HDR electro-optical transfer function characteristics are applied to the transmission video data V1', so that the display video data for displaying an HDR image is obtained. The display video data is supplied to the HDR display mapping unit 213.

At the HDR display mapping unit 213, display luminance adjustment is performed on the display video data in accordance with the maximum luminance display capability or the like of the CE monitor 214. The display video data subjected to such display luminance adjustment is supplied to the CE monitor 214. In accordance with this display video data, an HDR image is displayed on the CE monitor 214.

It should be noted that the reception device 200 further includes a subtitle bitmap decoder 215 to cope with a situation where the subtitle information included in the subtitle stream SS is bitmap data. This subtitle bitmap decoder 215 performs a decoding process on the subtitle stream SS, to obtain subtitle bitmap data. This subtitle bitmap data is supplied to the luminance level adjustment unit 209.

In this case, the subtitle information (transmission data) included in the subtitle stream SS is transmitted to the CLUT, and a CLUT output might have a YCbCr domain. Therefore, the subtitle bitmap data obtained by the subtitle bitmap decoder 215 is supplied directly to the luminance level adjustment unit 209. It should be noted that, in this case, the luminance Lf in the foreground region of the subtitle and the luminance Lb in the background region of the subtitle can be obtained from the CLUT output on the reception side.

The reception device 200 further includes a luminance level calculation unit 216 to cope with a situation where the luma dynamic range SEI message in the video stream VS has not been encoded, and any background image luminance value cannot be obtained from the SEI message. This luminance level calculation unit 216 has a configuration similar to that of the luminance level calculation unit 106 (see FIG. 15) in the transmission device 100 shown in FIG. 14.

In accordance with the transmission video data V1 obtained by the video decoder 204, the luminance level calculation unit 216 calculates, for each picture, the maximum luminance value "global_content_level_max", the minimum luminance value "global_content_level_min", and the average luminance value "global_content_level_ave" that correspond to the entire screen, and the maximum luminance values "partition_content_level_max", the minimum luminance values "partition_content_level_min", and the average luminance values "partition_content_level_ave" that correspond to the respective partition regions (partitions) obtained by dividing the screen by a predetermined number (see FIG. 15).

The reception device 200 also includes a threshold value setting unit 217 to cope with a situation where the luma dynamic range SEI message in the video stream VS has not been encoded or where the video stream VS includes an encoded luma dynamic range SEI message but does not include any threshold value for combining, and a situation where the subtitle stream SS does not include any threshold value for combining. This threshold value setting unit 217 has a configuration similar to that of the threshold value setting unit 107 in the transmission device 100 shown in FIG. 14.

In accordance with electro-optical transfer function characteristics (EOTF characteristics), this threshold value setting unit 217 sets a high-luminance threshold value "Th_max", a low-luminance threshold value "Th_min", and an average-luminance threshold value "Th_ave" for determining how the subtitle luminance is to be adjusted on the reception side (see FIG. 4).

Figure 31:
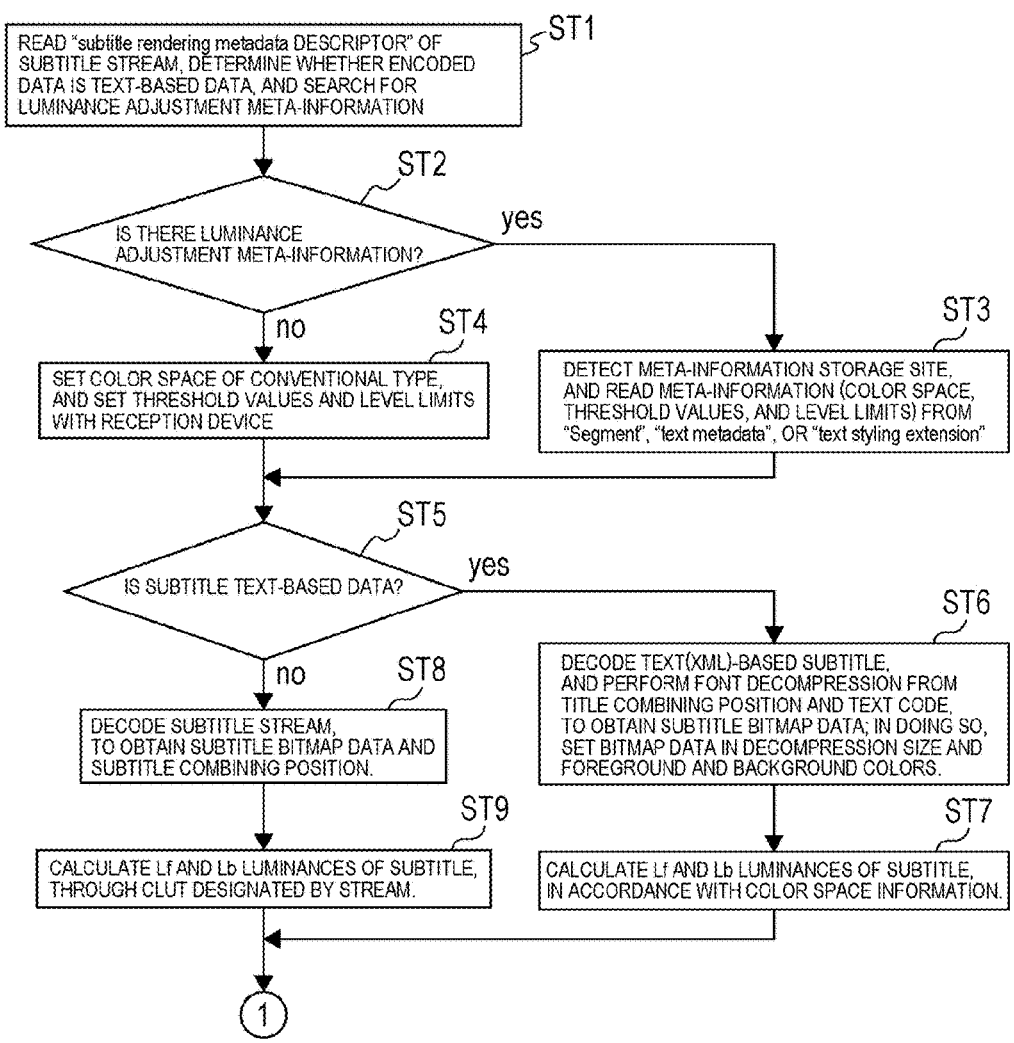
FIG. 31 is a flowchart showing an example of the control procedures in a subtitle superimposition process in a reception device (1/2).
Figure 32:
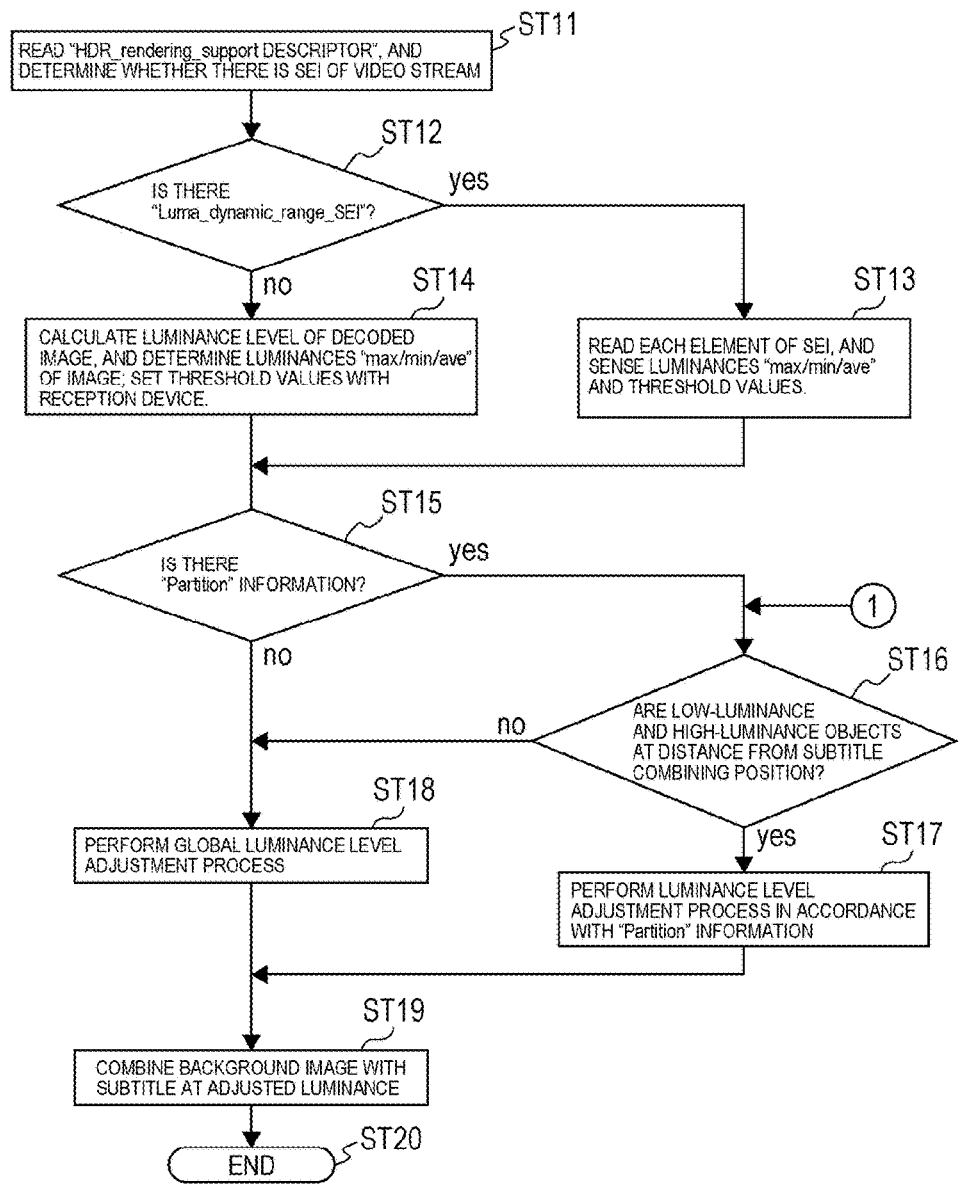
FIG. 32 is a flowchart showing the example of the control procedures in the subtitle superimposition process in the reception device (2/2).

The flowchart in FIGS. 31 and 32 shows an example of the control procedures in a subtitle superimposition process in the reception device 200. In step ST1, the reception device 200 reads the subtitle rendering metadata descriptor in the subtitle stream SS, determines whether the encoded data of the subtitle information is text-based data, and searches for luminance adjustment meta-information.

Next, in step ST2, the reception device 200 determines whether there is luminance adjustment meta-information. If there is luminance adjustment meta-information, the reception device 200 detects the meta-information storage site, and obtains meta-information (color space information, threshold values for combining, and subtitle luminance range limit information) from the storage site. After this step ST3, the reception device 200 moves on to the process in step ST5. If there is no luminance adjustment meta-information, on the other hand, the reception device 200 in step ST4 sets a color space of a conventional type, threshold values for combining, and subtitle luminance range limit information. After this step ST4, the reception device 200 moves on to the process in step ST5.

In step ST5, the reception device 200 determines whether the encoded data of the subtitle information is text-based data. If the encoded data of the subtitle information is text-based data, the reception device 200 in step ST6 decodes the text-based subtitle, and performs font decompression from the subtitle combining position and the character code, to obtain bitmap data. At this point, the bitmap data is in the decompression size and the colors of the foreground and the background. In step ST7, the reception device 200 calculates the luminance Lf of the foreground of the subtitle and the luminance Lb of the background of the subtitle, in accordance with the color space information. After this step ST7, the reception device 200 moves on to the process in step ST16.

If the encoded data of the subtitle information is not text-based data, on the other hand, the reception device 200 in step ST8 decodes the subtitle stream, to obtain the subtitle bitmap data and the subtitle combining position. In step ST9, through the CLUT designated by the stream, the reception device 200 calculates the luminance Lf of the foreground of the subtitle and the luminance Lb of the background of the subtitle. After this step ST9, the reception device 200 moves on to the process in step ST16.

In step ST11, the reception device 200 also reads the HDR rendering support descriptor, and searches for a luma dynamic range SEI in the video stream VS.

Next, in step ST12, the reception device 200 determines whether there is a luma dynamic range SEI message. If there is a lima dynamic range SEI message, the reception device 200 in step ST13 reads the respective elements in the SEI message, and detects the background image luminance values and the threshold values for combining. After this step ST13, the reception device 200 moves on to the process in step ST15. If there is a luma dynamic range SEI message, on the other hand, the reception device 200 in step ST14 determines the background image luminance values by calculating the luminance level of the decoded image, and sets the threshold values for combining. After this step ST14, the reception device 200 moves on to the process in step ST15.

In step ST15, the reception device 200 determines whether there is partition information. If there is partition information, the reception device 200 in step ST16 determines whether low-luminance and high-luminance objects are at a distance from the subtitle combining (superimposing) position. If such objects are not at a distance from the subtitle combining position, the reception device 200 moves on to the process in step ST18. If such objects are at a distance from the subtitle combining position, on the other hand, the reception device 200 in step ST17 performs a luminance level adjustment process, using the partition information. After this step ST17, the reception device 200 moves on to the process in step ST19.

In step ST18, the reception device 200 performs a global luminance level adjustment process. After this step ST8, the reception device 200 moves on to the process in step ST19. In step ST19, the reception device 200 combines the subtitle with (or superimposes the subtitle on) the background image with the adjusted luminance. After this step ST19, the reception device 200 in step ST20 ends the process.

The flowchart in FIG. 33 shows an example of the global luminance level adjustment process in the reception device 200. In step ST21, the reception device 200 starts the process. In step ST22, the reception device 200 determines whether the maximum luminance value is higher than the high-luminance threshold value. If the maximum luminance value is higher than the high-luminance threshold value, the reception device 200 in step ST23 determines whether the minimum luminance value is lower than the low-luminance threshold value. If the minimum luminance value is not lower than the low-luminance threshold value, the reception device 200 in step ST24 corrects the luminance level of the background of the subtitle to fall within the range between the maximum luminance and the minimum luminance of the subtitle in a case where the ratio between the maximum luminance and the minimum luminance of the subtitle is designated (see FIG. 10(*a*-2)).

In addition, if the minimum luminance value is lower than the low-luminance threshold value in step ST23, the reception device 200 in step ST25 determines whether the average luminance value is higher than the average-luminance threshold value. If the average luminance value is higher than the average-luminance threshold value, the reception device 200 in step ST26 corrects the luminance level of the background of the subtitle to fall within the range between the maximum luminance and the minimum luminance of the subtitle in a case where the ratio between the maximum luminance and the minimum luminance of the subtitle is designated (see FIG. 11(*d*-2)). If the average luminance value is not higher than the average-luminance threshold value, on the other hand, the reception device 200 in step ST27 corrects the luminance level of the foreground of the subtitle to fall within the range between the maximum luminance and the minimum luminance of the subtitle in a case where the ratio between the maximum luminance and the minimum luminance of the subtitle is designated (see FIG. 11(*c*-2)).

Further, if the maximum luminance value is not higher than the high-luminance threshold value in step ST22, on the other hand, the reception device 200 in step ST28 determines whether the minimum luminance value is lower than the low-luminance threshold value. If the minimum luminance value is lower than the low-luminance threshold value, the reception device 200 in step ST29 corrects the luminance level of the foreground of the subtitle to fall within the range between the maximum luminance and the minimum luminance of the subtitle in a case where the ratio between the maximum luminance and the minimum luminance of the subtitle is designated (see FIG. 10(*b*-2)). If the minimum luminance value is not lower than the low-luminance threshold value, on the other hand, the reception device 200 in step ST30 does not perform any subtitle luminance adjustment.

It should be noted that, as for a luminance level adjustment process using the partition information, the reception device 200 performs the process shown in the flowchart in FIG. 33 for each partition. Of the results from the respective partitions, the final determination is made in accordance with the rule of majority, or priority levels (starting from "1") are set so that processes are performed in the order of priority levels. As for priority levels, priority level 1 is given to the result from step ST24 in FIG. 33 (or the result from the partition D in the example shown in FIG. 13), priority level 2 is given to the result from step ST26 in FIG. 33 (or the result from the partition C in the example shown in FIG. 13), priority level 3 is given to the result from step ST29 in FIG. 33 (or the result from the partition F in the example shown in FIG. 13), and priority level 4 is given to the result from step ST27 in FIG. 33 (or the result from the partition E in the example shown in FIG. 13), for example.

As described above, in the transmission/reception system 10 shown in FIG. 1, the luminance level adjustment information for adjusting the luminance level of a subtitle is inserted into the video stream VS and the subtitle stream SS. Accordingly, the reception side can perform subtitle luminance level adjustment in a preferred manner. Thus, visual fatigue can be reduced, and the atmosphere of a background image or the like can be prevented from being spoiled.

Also, in the transmission/reception system 10 shown in FIG. 1, the identification information indicating that there is the luminance level adjustment information inserted in the video stream VS is inserted into the transport stream TS (container). Thus, the reception side can easily recognize, from the identification information, that there is the luminance level adjustment information inserted in the video stream VS.

Also, in the transmission/reception system 10 shown in FIG. 1, the identification information indicating that there is the luminance level adjustment information inserted in the subtitle stream SS is inserted into the transport stream TS (container). Thus, the reception side can easily recognize, from the identification information, that there is the luminance level adjustment information inserted in the subtitle stream SS.

<2. Modifications>

In the above described example of an embodiment, the container is a transport stream (MPEG-2 TS). However, transport according to the present technology is not necessarily performed with a transport stream TS, but video layers can be obtained with some other packet by the same method in the case of ISOBMFF, MMT, or the like, for example. Also, a subtitle stream is not necessarily formed with a PES packet having TTML in segments disposed in multiple payloads as described above. Instead, the present technology can be embodied by setting TTML directly in a PES packet having the multiple payloads or in a section.

The present technology may also be embodied in the structures described below.

(1) A transmission device including:

a video encoder that generates a video stream including image data;

a subtitle encoder that generates a subtitle stream including subtitle information;

an adjustment information insertion unit that inserts luminance level adjustment information into the video stream and/or the subtitle stream, the luminance level adjustment information being designed for adjusting a luminance level of a subtitle; and a transmission unit that transmits a container in a predetermined format, the container containing the video stream and the subtitle stream.

(2) The transmission device of (1), in which
the luminance level adjustment information is luminance level adjustment information corresponding to an entire screen and/or luminance level adjustment information corresponding to respective partition regions obtained by dividing the screen by a predetermined number.

(3) The transmission device of (2), in which
the luminance level adjustment information to be inserted into the video stream includes a maximum luminance value, a minimum luminance value, and an average luminance value that are generated in accordance with the image data.

(4) The transmission device of (3), in which
the luminance level adjustment information to be inserted into the video stream further includes a high-luminance threshold value, a low-luminance threshold value, and an average-luminance threshold value that are set in accordance with electro-optical transfer function characteristics.

(5) The transmission device of (2), in which
the luminance level adjustment information to be inserted into the subtitle stream includes subtitle luminance range limit information.

(6) The transmission device of (5), in which
the luminance level adjustment information to be inserted into the subtitle stream further includes a high-luminance threshold value, a low-luminance threshold value, and an average-luminance threshold value that are set in accordance with electro-optical transfer function characteristics.

(7) The transmission device of (5) or (6), in which
the luminance level adjustment information to be inserted into the subtitle stream further includes color space information.

(8) The transmission device of any of (1) to (7), in which
the subtitle encoder generates the subtitle stream in accordance with subtitle text information in TTML, and
the adjustment information insertion unit inserts the luminance level adjustment information, using an element of metadata in a header of a TTML structure.

(9) The transmission device of any of (1) to (7), in which
the subtitle encoder generates the subtitle stream in accordance with subtitle text information in TTML, and
the adjustment information insertion unit inserts the luminance level adjustment information, using an element of styling extension in a header of a TTML structure.

(10) The transmission device of any of (1) to (7), in which
the subtitle encoder generates the subtitle stream having segments as components, and
the adjustment information insertion unit inserts a segment containing the luminance level adjustment information into the subtitle stream.

(11) The transmission device of any of (1) to (10), further including
an identification information insertion unit that inserts identification information into the container, the identification information indicating that there is the luminance level adjustment information inserted in the video stream.

(12) The transmission device of any of (1) to (11), further including
an identification information insertion unit that inserts identification information into the container, the identification information indicating that there is the luminance level adjustment information inserted in the subtitle stream.

(13) The transmission device of (12), in which
information indicating an insertion position of the luminance level adjustment information in the subtitle stream is added to the identification information.

(14) A transmission method including:
a video encoding step of generating a video stream including image data;
a subtitle encoding step of generating a subtitle stream including subtitle information;
an adjustment information insertion step of inserting luminance level adjustment information into the video stream and/or the subtitle stream, the luminance level adjustment information being designed for adjusting a luminance level of a subtitle; and
a transmission step of transmitting a container in a predetermined format, the container containing the video stream and the subtitle stream, the container being transmitted by a transmission unit.

(15) A reception device including:
a reception unit that receives a container in a predetermined format, the container containing a video stream including image data and a subtitle stream including subtitle information;
a video decoding unit that obtains image data by performing a decoding process on the video stream;
a subtitle decoding unit that obtains bitmap data of a subtitle by performing a decoding process on the subtitle stream;
a luminance level adjustment unit that performs a luminance level adjustment process on the bitmap data in accordance with luminance level adjustment information; and
a video superimposition unit that superimposes bitmap data obtained by the luminance level adjustment unit after the luminance level adjustment, on the image data obtained by the video decoding unit.

(16) The reception device of (15), in which
the luminance level adjustment unit performs the luminance level adjustment, using the luminance level adjustment information inserted in the video stream and/or the subtitle stream.

(17) The reception device of (15), further including
a luminance level adjustment information generation unit that generates the luminance level adjustment information,
in which the luminance level adjustment unit performs the luminance level adjustment, using the luminance level adjustment information generated by the luminance level adjustment information generation unit.

(18) A reception method including:
a reception step of receiving a container in a predetermined format, the container containing a video stream including image data and a subtitle stream including subtitle information, the container being received by a reception unit;
a video decoding step of obtaining image data by performing a decoding process on the video stream;
a subtitle decoding step of obtaining bitmap data of a subtitle by performing a decoding process on the subtitle stream;
a luminance level adjustment step of performing a luminance level adjustment process on the bitmap data in accordance with luminance level adjustment information; and
a video superimposition step of superimposing bitmap data obtained in the luminance level adjustment step after the luminance level adjustment, on the image data obtained in the video decoding step.

(19) A transmission device including:
a transmission unit that transmits a video stream in a container in a predetermined format, the video stream including transmission video data obtained through high dynamic range photoelectric conversion performed on high dynamic range image data; and an identification information insertion unit that inserts identification information into the container, the identification information indicating that the video stream is compatible with a high dynamic range.

(20) A transmission device including:

a transmission unit that transmits a video stream and a subtitle stream in a container in a predetermined format, the video stream including image data, the subtitle stream including text information about a subtitle; and an identification information insertion unit that inserts identification information into the container, the identification information indicating that the subtitle is transmitted in the form of a text code.

The principal feature of the present technology lies in that luminance level adjustment information for adjusting the luminance level of a subtitle is inserted into a video stream VS and a subtitle stream SS, so that the reception side can perform prefer red subtitle luminance level adjustment (see FIGS. 27(a) and 27(b)). Thus, visual fatigue can be reduced, and the atmosphere of a background image can be prevented from being spoiled, for example.

REFERENCE SIGNS LIST

10 Transmission/reception system
100 Transmission device
101 Control unit
102 HDR camera
103 HDR photoelectric conversion unit
103a Master monitor
104 RGB/YCbCr conversion unit
105 Video encoder
106 Luminance level calculation unit
106a, 106b Pixel value comparison unit
107 Threshold value setting unit
108 Subtitle generation unit
109 Text format conversion unit
110 Subtitle encoder
111 System encoder
112 Transmission unit
200 Reception device
201 Control unit
202 Reception unit
203 System decoder
204 Video decoder
205 Subtitle text decoder
206 Font decompression unit
208 RGB/YCbCr conversion unit
209 Luminance level adjustment unit
210 Video superimposition unit
211 YCbCr/RGB conversion unit
212 HDR electro-optical conversion unit
213 HDR display mapping unit
214 CE monitor

The invention claimed is:

1. A transmission device, comprising:
processing circuitry configured to
generate a video stream including image data,
generate a subtitle stream including subtitle information,
insert luminance level adjustment information into at least one of the video stream and the subtitle stream, the luminance level adjustment information including an average luminance value generated in accordance with the image data and including a threshold value indicating whether luminance of a subtitle foreground or a subtitle background in the subtitle stream is to be adjusted, and
transmit a container containing the video stream and the subtitle stream.

2. The transmission device according to claim 1, wherein the luminance level adjustment information is luminance level adjustment information corresponding to an entire area of a screen and/or luminance level adjustment information corresponding to respective partition regions obtained by dividing the entire area of the screen by a predetermined number.

3. The transmission device according to claim 2, wherein the luminance level adjustment information is inserted into the video stream and includes a maximum luminance value and a minimum luminance value,
the maximum luminance value and the minimum luminance value being generated in accordance with the image data.

4. The transmission device according to claim 3, wherein the threshold value of the luminance level adjustment information inserted into the video stream further includes a high-luminance threshold value, a low-luminance threshold value, and an average-luminance threshold value,
the high-luminance threshold value, the low-luminance threshold value, and the average-luminance threshold value being set in accordance with electro-optical transfer function characteristics.

5. The transmission device according to claim 2, wherein the luminance level adjustment information is inserted into the subtitle stream and includes subtitle luminance range limit information.

6. The transmission device according to claim 5, wherein the threshold value of the luminance level adjustment information inserted into the subtitle stream further includes a high-luminance threshold value, a low-luminance threshold value, and an average-luminance threshold value,
the high-luminance threshold value, the low-luminance threshold value, and the average-luminance threshold value being set in accordance with electro-optical transfer function characteristics.

7. The transmission device according to claim 5, wherein the luminance level adjustment information inserted into the subtitle stream further includes color space information.

8. The transmission device according to claim 1, wherein the processing circuitry is further configured to
generate the subtitle stream in accordance with subtitle text information in Timed Text Markup Language (TTML), and
insert the luminance level adjustment information using an element of metadata in a header of a TTML structure.

9. The transmission device according to claim 1, wherein the processing circuitry is further configured to
generate the subtitle stream in accordance with subtitle text information in Timed Text Markup Language (TTML), and
insert the luminance level adjustment information using an element of styling extension in a header of a TTML structure.

10. The transmission device according to claim 1, wherein the processing circuitry is further configured to generate the subtitle stream having segments as components, and insert a segment containing the luminance level adjustment information into the subtitle stream.

11. The transmission device according to claim 3, wherein the processing circuitry is further configured to insert identification information into the container, the identification information indicating that there is the luminance level adjustment information inserted in the video stream.

12. The transmission device according to claim 5, wherein the processing circuitry is further configured to insert identification information into the container, the identification information indicating that there is the luminance level adjustment information inserted in the subtitle stream.

13. The transmission device according to claim 12, wherein the identification information includes information indicating an insertion position of the luminance level adjustment information in the subtitle stream.

14. A transmission method, comprising:

generating, by processing circuitry, a video stream including image data;

generating, by the processing circuitry, a subtitle stream including subtitle information;

inserting, by the processing circuitry, luminance level adjustment information into at least one of the video stream and the subtitle stream, the luminance level adjustment information including an average luminance value generated in accordance with the image data and including a threshold value indicating whether luminance of a subtitle foreground or a subtitle background in the subtitle stream is to be adjusted; and transmitting, by the processing circuitry, a container containing the video stream and the subtitle stream.

15. A reception device, comprising:

processing circuitry configured to receive a container containing a video stream including image data and a subtitle stream including subtitle information, obtain image data by performing a decoding process on the video stream, obtain bitmap data of a subtitle by performing a decoding process on the subtitle stream, perform a luminance level adjustment process on the bitmap data in accordance with luminance level adjustment information inserted in at least one of the video stream and the subtitle stream, the luminance level adjustment information including an average luminance value generated in accordance with the image data and including a threshold value indicating whether luminance of a subtitle foreground or a subtitle background in the subtitle stream is to be adjusted, and superimpose bitmap data obtained after the luminance level adjustment on the obtained image data.

16. The reception device according to claim 15, wherein the processing circuitry is further configured to perform the luminance level adjustment using the luminance level adjustment information inserted in at least one of the video stream and the subtitle stream.

17. The reception device according to claim 15, wherein the processing circuitry is further configured to generate the luminance level adjustment information, and perform the luminance level adjustment using the generated luminance level adjustment information.

18. A reception method, comprising:

receiving, by processing circuitry, a container containing a video stream including image data and a subtitle stream including subtitle information;

obtaining, by the processing circuitry, image data by performing a decoding process on the video stream;

obtaining, by the processing circuitry, bitmap data of a subtitle by performing a decoding process on the subtitle stream;

performing, by the processing circuitry, a luminance level adjustment process on the bitmap data in accordance with luminance level adjustment information inserted in at least one of the video stream and the subtitle stream, the luminance level adjustment information including an average luminance value generated in accordance with the image data and including a threshold value indicating whether luminance of a subtitle foreground or a subtitle background in the subtitle stream is to be adjusted; and superimposing, by the processing circuitry, bitmap data obtained after the luminance level adjustment on the image data.

* * * * *